United States Patent
Rodriguez, Jr. et al.

(10) Patent No.: US 6,520,646 B2
(45) Date of Patent: Feb. 18, 2003

(54) INTEGRATED FRONT PROJECTION SYSTEM WITH DISTORTION CORRECTION AND ASSOCIATED METHOD

(75) Inventors: Ernesto M. Rodriguez, Jr., Austin, TX (US); Steven G. Saxe, Round Rock, TX (US); Patricia H. DeLuca, Round Rock, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 115 days.

(21) Appl. No.: 09/746,808

(22) Filed: Dec. 22, 2000

(65) Prior Publication Data

US 2001/0017687 A1 Aug. 30, 2001

Related U.S. Application Data

(63) Continuation-in-part of application No. 09/616,563, filed on Jul. 14, 2000, now Pat. No. 6,394,609, which is a continuation-in-part of application No. 09/261,715, filed on Mar. 3, 1999, now Pat. No. 6,179,426.

(51) Int. Cl.[7] .............................................. G03B 21/14
(52) U.S. Cl. ........................................ 353/69; 353/70
(58) Field of Search .......................... 353/69, 70, 79, 353/122; 345/647, 649

(56) References Cited

U.S. PATENT DOCUMENTS

| | | | |
|---|---|---|---|
| 1,979,921 A | 11/1934 | Wier | 353/79 |
| 3,940,209 A | 2/1976 | Portner et al. | 353/79 |
| 3,951,534 A | 4/1976 | Altman | 353/70 |
| 4,012,115 A | 3/1977 | Brown | 350/128 |
| 4,092,064 A | 5/1978 | Puel | 353/79 |
| 4,130,352 A | 12/1978 | Overman et al. | 353/79 |
| 4,156,561 A | 5/1979 | Lucas | 353/38 |
| 4,298,246 A | 11/1981 | Iwamura | 350/122 |

(List continued on next page.)

FOREIGN PATENT DOCUMENTS

| | | | |
|---|---|---|---|
| CN | 1226687 A | 8/1999 | G03B/21/56 |
| DE | 197 12 244 A1 | 10/1998 | G03B/21/10 |
| EP | 0 773 678 A2 | 5/1997 | |
| EP | 0 825 480 A2 | 2/1998 | |
| EP | 0 837 351 A2 | 4/1998 | G02B/27/28 |
| EP | 0 837 351 A3 | 12/1998 | G02B/27/28 |
| EP | 1 018 842 A2 | 7/2000 | H04N/9/31 |
| JP | 05297465 | 11/1993 | G03B/21/60 |
| JP | 11331737 | 11/1999 | H04N/5/74 |
| JP | 2000206452 | 7/2000 | G02B/27/18 |
| WO | WO 00/33564 A1 | 6/2000 | |
| WO | 01 43961 A1 | 6/2001 | |

OTHER PUBLICATIONS

International Search Report PCT/US02/03747 dated Jul. 12, 2002.

Primary Examiner—William Dowling
(74) Attorney, Agent, or Firm—Yen Tong Florczak; Nestor F. Ho

(57) ABSTRACT

A front projection system and associated method are disclosed that correct distortion for a front projector device. The front projector device is characterized by off-axis optics and a throw-to-screen diagonal ratio of at most 1 which generate distortion including pincushion, keystone and anamorphic distortion components. Further, the projection device has an electronic distortion correction component operable to pre-distort an image prior to projection in order to correct for the pincushion, keystone and anamorphic distortion components of the projector device. Further, an associated method is also disclosed for correcting distortion generated in a projection system by a combination of optical and electronic correction. The method comprises setting a limit on the amount of image information that is acceptable to lose through the optical components, and selecting an optical solution is comprising optics having inherent distortion within the set limit. Then, an electronic correction component is selected that is operable to pre-distort an image to correct for remaining distortion not corrected by the optics of the optical solution.

22 Claims, 17 Drawing Sheets

U.S. PATENT DOCUMENTS

| | | | |
|---|---|---|---|
| 4,565,430 A | 1/1986 | Grunwald | 353/61 |
| 4,571,631 A | 2/1986 | Breglia et al. | |
| 4,756,615 A | 7/1988 | Hildebrand | 353/74 |
| 4,787,737 A | 11/1988 | Ogawa et al. | 353/57 |
| 4,911,529 A | 3/1990 | Van DeVen | |
| 5,096,278 A | 3/1992 | Yoshioka et al. | 359/459 |
| 5,210,641 A | 5/1993 | Lewis | 359/448 |
| 5,278,596 A | 1/1994 | Machtig | 353/122 |
| 5,349,400 A | 9/1994 | Kaplan et al. | 353/119 |
| 5,355,188 A | 10/1994 | Biles et al. | |
| 5,361,164 A | 11/1994 | Steliga | |
| 5,379,080 A | 1/1995 | Onozuka | |
| 5,414,521 A | 5/1995 | Ansley | |
| 5,624,173 A | 4/1997 | Davidson | 353/119 |
| 5,663,817 A | 9/1997 | Frapin et al. | 349/5 |
| 5,694,245 A | 12/1997 | Goto et al. | 359/460 |
| 6,023,369 A | 2/2000 | Goto | 359/443 |
| 6,122,865 A | 9/2000 | Branc et al. | |
| 6,179,426 B1 * | 1/2001 | Rodriguez, Jr. et al. | 353/69 |
| 6,394,609 B1 * | 5/2002 | Rodriguez, Jr. et al. | 353/79 |
| 6,394,610 B2 * | 5/2002 | Rodriguez, Jr. | 353/79 |

* cited by examiner

TR/D

ON-AXIS SYSTEM

OFF-AXIS SYSTEM

OFF-AXIS SYSTEM W/ CORRECTION

INTEGRATED FRONT PROJECTION SYSTEM WITH DISTORTION CORRECTION AND ASSOCIATED METHOD

CROSS-REFERENCE TO RELATED APPLICATIONS

This application is a continuation-in-part of U.S. patent application Ser. No. 09/261,715, filed on Mar. 3, 1999 and entitled "Integrated Projection System", and now U.S. Pat. No. 6,179,426, and of U.S. patent application Ser. No. 09/616,563, filed Jul. 14, 2000, now U.S. Pat. No. 6,394,609, both which are hereby incorporated by reference.

BACKGROUND OF THE INVENTION

The present invention relates to a method and apparatus for displaying an optically corrected image using a small throw ratio, off axis projection display system. In a is particular embodiment, the present invention relates to an off-axis integrated front projection system having a throw ratio less or equal to 1.0 that coordinates specialized projection optics and electronics optimized to work together to create a high-quality viewing image and correct lens induced optical distortion, keystone distortion, and anamorphic distortion.

Electronic display systems are devices capable of presenting electronically generated images. Whether for use in home-entertainment, advertising, videoconferencing, computing, data-conferencing or group presentations, the demand exists for an appropriate display device.

Image quality remains a very important factor in choosing a video display device. However, as the need increases for display devices offering a larger picture, factors such as cost and device size and weight become vital considerations. Larger display systems are preferable for group or interactive presentations. The size of the display system cabinet has proven an important factor, particularly for home or office use, where space to place a large housing or cabinet may not be available.

Currently, the most common video display device is the typical CRT monitor, usually recognized as a television screen. CRT devices are relatively inexpensive for applications requiring small to medium size images (e.g., 9" to 27", ~23 to 70 cms). (image size traditionally is measured along the diagonal dimension of a rectangular screen). However, as image size increases, the massive proportions and weight of large CRT monitors become cumbersome and severely restrict the use and placement of the monitors. Also, screen curvature issues appear as the screen size increases. Large CRT monitors consume a substantial amount of electrical power and produce significant electromagnetic radiation. Finally, the cost of very large CRT monitors may be prohibitive for many applications.

A new category of presentation systems includes so-called thin plasma displays. Much attention has been given to the ability of plasma displays to provide a relatively thin (about 75–100 mm) cabinet, which may be placed on a wall as a picture display in an integrated compact package. However, at the present time, plasma displays are costly and suffer from the disadvantages of low brightness (approx. 200–400 cd/m$^2$ range) and difficulty in making repairs. Plasma display panels are heavy (~80–100 lbs., 36–45 kg.), and walls on which they are placed may require structural strengthening.

A traditional type of video presentation device is the projection system, including both rear and front projection. In projection systems, one or more imagers creates an image that is projected using optical lenses. An imager generally is an electronically controlled array of pixels that can be turned on or off to create an image. Imagers, or light valves as they are sometimes called, may be reflective (an "on" pixel reflects incident light to form the image) or transmissive (an "on" pixel transmits incident light). Common imager types include liquid crystal display devices and digital micromirror devices.

Rear projection generally comprises a projection mechanism or engine contained within a large housing for projection to the rear of a transmissive screen. Back-projection screens are designed so that the projection mechanism and the viewer are on opposite sides of the screen. The screen has light transmitting properties to direct the transmitted image to the viewer.

A front-projection system is one that has the projection mechanism and the viewer on the same side of the screen. Front projection systems present many different optical and arrangement challenges not present in rear projection systems, as the image is reflected back to the audience, rather than transmitted. An example of a front projection system is a portable front projector and a front projection screen, for use in meeting room settings or in locations such as an airplane cabin.

Front projection systems have traditionally not been considered attractive for interactive applications because of factors such as blocking of the image by the projector or the presenter and image distortion.

Traditional electronic front projectors typically require a room that affords the projection volume necessary for image expansion without physical obstructions. Although images may be projected upon a large flat surface, such as a wall, better image quality is achieved by the use of a separate screen. FIGS. 1 and 2 illustrate a traditional front projection system. A projector 10 is placed on a table or other elevated surface to project an image upon a screen or projection surface 20.

Traditional integrated projectors require optical adjustment, such as focusing every time the projector is repositioned, as well as mechanical adjustment, such as raising of front support feet to position the image on the projection screen. Electronic connections, such as those to a laptop computer, generally are made directly to the projector, thus necessitating that the projector be readily accessible to the presenter or that the presenter runs the necessary wiring in advance.

To achieve a suitable image size, and also due to focus limitations, the projector 10 requires a certain "projection zone" and distance from the screen 20. Table A lists the published specifications for some common electronic projectors currently in the market.

TABLE A

| Projector Type | Lens Focal Length | Imager | Smallest Screen Diagonal | Shortest Throw Distance | Throw Ratio | Maximum Keystone Correction |
|---|---|---|---|---|---|---|
| CTX Opto ExPro 580 | * | 163 mm Transmissive LCD | 1.0 m | 1.1 m | 1.1 | 20° offset/optical |
| InFocus LP425 | * | 18 mm Reflective DMD | 1.3 m | 1.5 m | 1.2 | 18° offset |
| Chisholm Dakota X800 | 43–58.5 mm | 23 mm Reflective LCD | 0.55 m | 1.2 m | 2.2 | 15° electronic |
| Epson Powerlite 7300 | 55–72 mm | 33.5 Transmissive LCD | 0.58 m | 1.1 m | 1.9 | * |
| Proxima Impression A2 | 45–59 mm | 23 mm Transmissive LCD | 0.5 m | 1.0 m | 2.0 | 12° offset |
| 3M MP8620 | 167 mm | 163 mm Transmissive LCD | 1.0 m | 1.2 m | 1.2 | 16° offset/optical |

* Not given in published specifications

Throw distance is defined as the distance from the projection lens to the projection screen measured along the optical axis of the projection lens. Throw ratio usually is defined as the ratio of throw distance to screen diagonal. Short throw distance is defined as at most one meter. To achieve a large image, between ~40 to ~60 inches (~1 to ~1.5 meters), a projector having a throw ratio of approximately 1.5 must be positioned at least 3.5 to 7.5 feet (approximately ~1.5 to ~2.25 meters) away from the wall or screen.

The existence of this "projection zone" in front of the screen prevents the viewer from interacting closely with the projected image. If the presenter, for example, wishes to approach the image, the presenter will block the projection and cast a shadow on the screen.

The projection zone may be reduced by moving the projector closer or off-axis from the screen. However, optical distortion effects significantly affect the quality of a projected image at short throw, small throw ratio, and offset angles. There are three distortion effects of particular concern in off-axis projection, especially in front projection systems: keystone geometric distortion, anamorphic geometric distortion, and projection lens imaging distortions, such as third order pincushion distortion. The effects of these distortion components are increased, the closer the projection lens is to the screen.

Those familiar with the use of electronic projectors will appreciate that placing the projector at an angle to the central normal axis of the screen (i.e., off-axis) produces a trapezoidal shape distortion of the image, known as a keystone effect. Keystoning is a geometric image distortion where the projection of a rectangular or square image results in a screen image that resembles a keystone or trapezoid, that is a quadrilateral having parallel upper and lower sides, but said sides being of different lengths.

Methods for the reduction of keystoning again are dependent upon the position of the projector with respect to the screen. A measure of keystone correction may be achieved by optical and by electronic methods. For moderate (10°–20° off axis) keystone correction in LCD projectors, optical methods are presently preferable, as electronic methods may suffer from pixelation, as pixels become misaligned with the image features. Most new electronic projectors offer a limited degree of optical keystone correction, often achieved by mechanical offset of the projection components. However, the placement of the projector at moderate offset angles may still interfere with the line of sight of the audience.

Anamorphic distortion causes a projected image to be stretched unequally in the vertical direction above and below the optical axis centerline.

Pincushion distortion is a third order distortion generated by the projection lens. The degree of pincushion distortion is related to the complexity of the lens and to the lens design.

Available optical keystone correction in presently commercially available large throw ratio and throw distance portable electronic front projectors generally ranges between 10° to 20°. While it may be theoretically possible to correct these distortion components in small throw-ratio, off-axis systems by optical means, the cost of developing and manufacturing specialized exotic lenses may be so high as to destroy the commercial attractiveness of such a system. Similarly, electronic means of image distortion correction are deficient at short throw (less than 1 meter), small throw ratio (less or equal to 1), off axis projection, due to the effects of image pixelation and misalignment.

Image pixelation occurs when the pixels in a projection imager become misaligned with the image features. No commercially available correction mechanism has addressed satisfactorily the issues of optical distortion and image quality in small throw-ratio, short throw, off-axis front projection systems.

A newer means for electronic image correction is discussed in U.S. Pat. No. 5,594,676, issued to Greggain, et al., entitled "Digital Image Warping System" and in J. Goel, et al., "Correcting Distortions in Digital Displays and Projectors Using Real-Time Digital Image Warping," SID 99 Digest, pp. 238–241 (hereinafter "SID Article"). Under this system of electronic correction an image handling microchip predistorts the output image on an imager (such as an LCD or DMD imager) to compensate for distortions introduced by the rest of the system. This system corrects over a wider range and corrects more types of distortion.

However, such system requires extensive computing power and a dedicated image handling IC. Even more importantly, the pre-distortion of the image causes significant loss of data. For example, an image in an XGA imager contains 1024×768 pixels of image data. If the image is pre-distorted as discussed in the SID Article, only a fraction of those pixels may be used. The imager bounds the entire pre-distorted image. Therefore, in the best case scenario, if the pre-distorted image may be correctly formatted to use the maximum possible area in the imager, only the widest point of the pre-distorted image would use all of the pixels in a row. Similarly, only the tallest portion of the pre-distorted image would use all of the pixels in a column. For all other rows and columns, pixel data necessarily will have to be omitted. As the amount of distortion increases, the shape variations of the pre-distorted image increase. Therefore, the more severe the correction necessary, the more information will be lost. While such information loss may not be critical in some applications, the data loss may severely affect certain applications, such as static presentations including small features or numbers.

The need remains for a large screen video presentation system that offers efficient space utilization, and allows for user interaction. Such a system should preferably correct the various distortion components within a displayed image while minimizing data loss.

SUMMARY OF THE INVENTION

The present invention provides a method for manufacture for an off-axis, small throw ratio projection system. The system of the present invention greatly reduces the projection zone by placing the projector at a short distance and off-axis from the projection screen. A reduced and displaced projection zone offers immediate and attractive advantages. A large image achieved by a projector closer to the screen allows the presenter to get closer to the screen without interfering with the image and reduces the space required for front projection.

However, small throw ratio (where the throw ratio is less equal to 1), off-axis projection induces large distortion effects. The present invention addresses these distortion effects by a novel method of combining optical correction with electronic correction.

The present invention provides a projection system and associated method that corrects, that is reduces or eliminates, distortion components within a projected image. In one embodiment, the present invention includes a front projection system having a front projector device coupled to a projection screen. The front projector device is characterized by off-axis projection and a throw ratio of at most 1, which generate distortion including pincushion, keystone, and anamorphic distortion components. The projection device has an electronic distortion correction component operable to pre-distort an image prior to projection. The method of the present invention combines optical and electronic correction in order to correct for the pincushion, keystone and anamorphic distortion components of the projector device.

In one embodiment, the optics includes a 9.44 mm focal length wide-angle projection lens that generates approximately 10% pincushion distortion. The electronic distortion correction component includes an integrated circuit chip having image pre-distortion functions. Off-axis optics further generate approximately 74% keystone distortion and approximately 34% anamorphic distortion. According to another aspect of the present invention, a method is disclosed for correcting distortion generated in a projection system by a combination of optical and electronic correction. The method includes setting a limit on the amount of image information that is acceptable to lose through the optical components, and selecting an optical solution, including optics having inherent distortion within the set limit. An electronic correction component is then selected that is operable to pre-distort an image to correct for remaining distortion not corrected by the optics of the optical solution. In a particular embodiment, the projection lenses are placed at a predetermined distance and angle from the projection screen. Electronic correction is achieved by "warping" the electronic image in accordance with a warp map that accounts for the particular distortion components at the specific throw distance and projection angle.

DETAILED DESCRIPTION OF THE INVENTION

Figure 1:
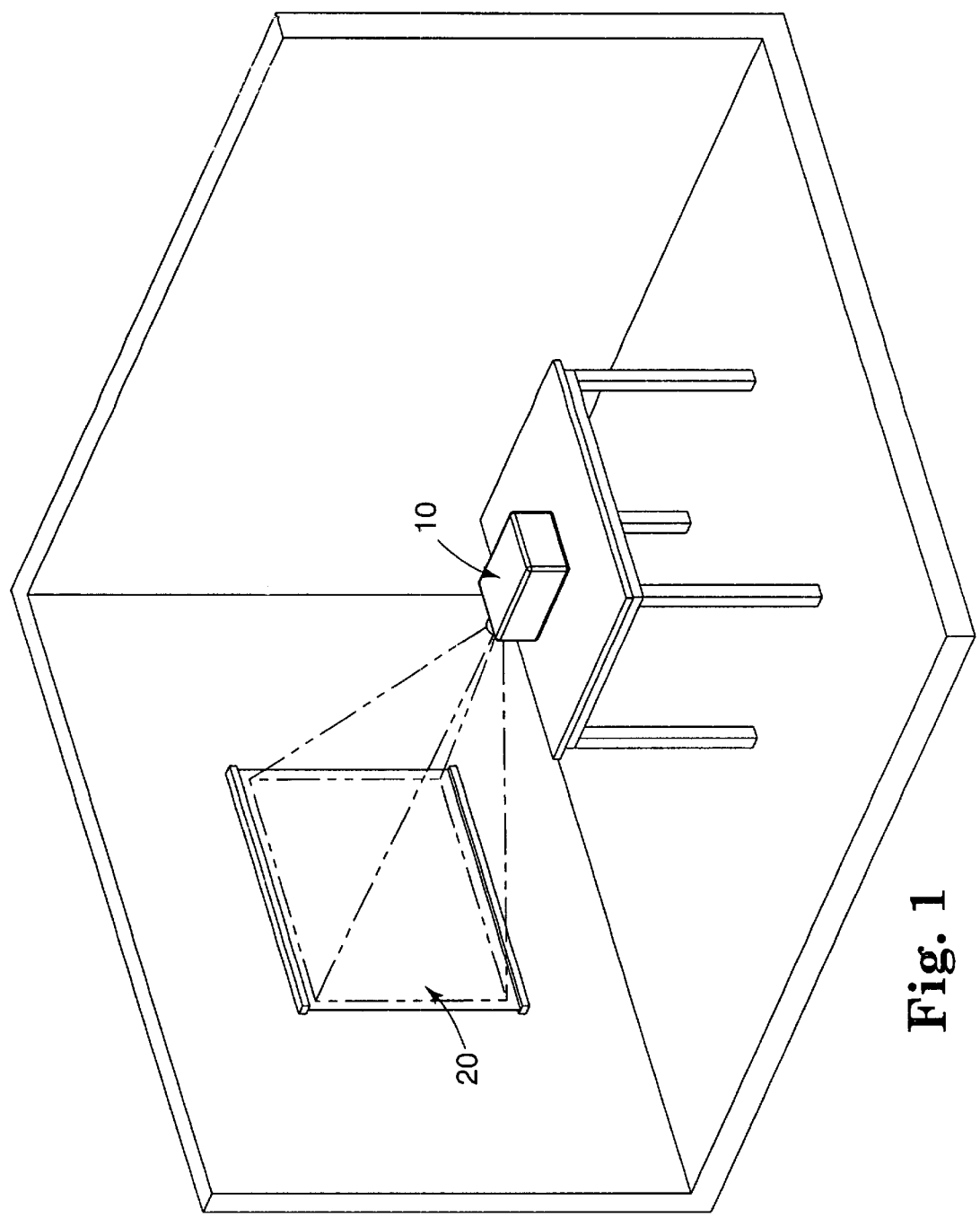
FIG. 1 is a perspective view of a traditional projection device and screen arrangement.
Figure 2:
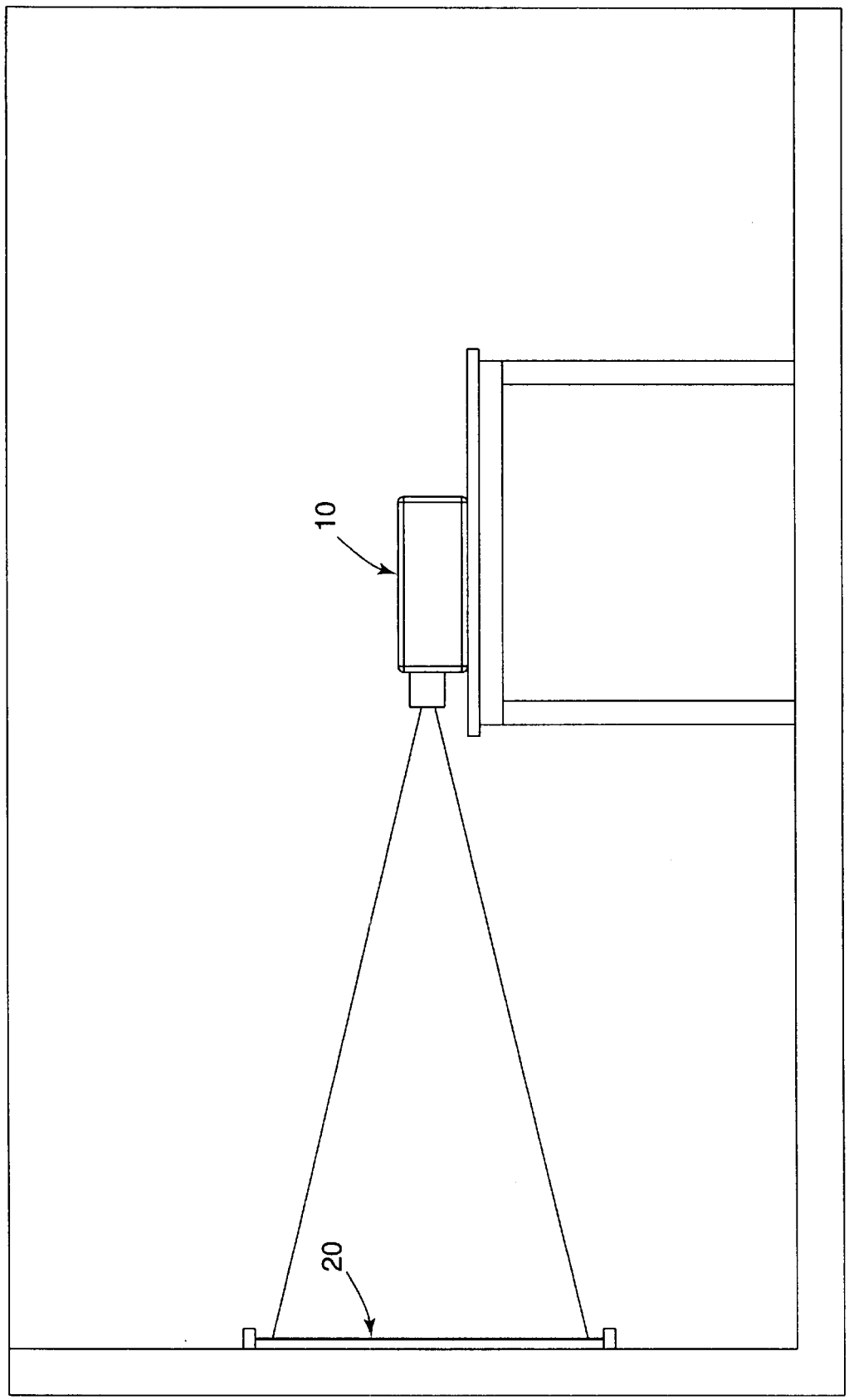
FIG. 2 is an elevation side view of the arrangement illustrated in FIG. 1.
Figure 3:
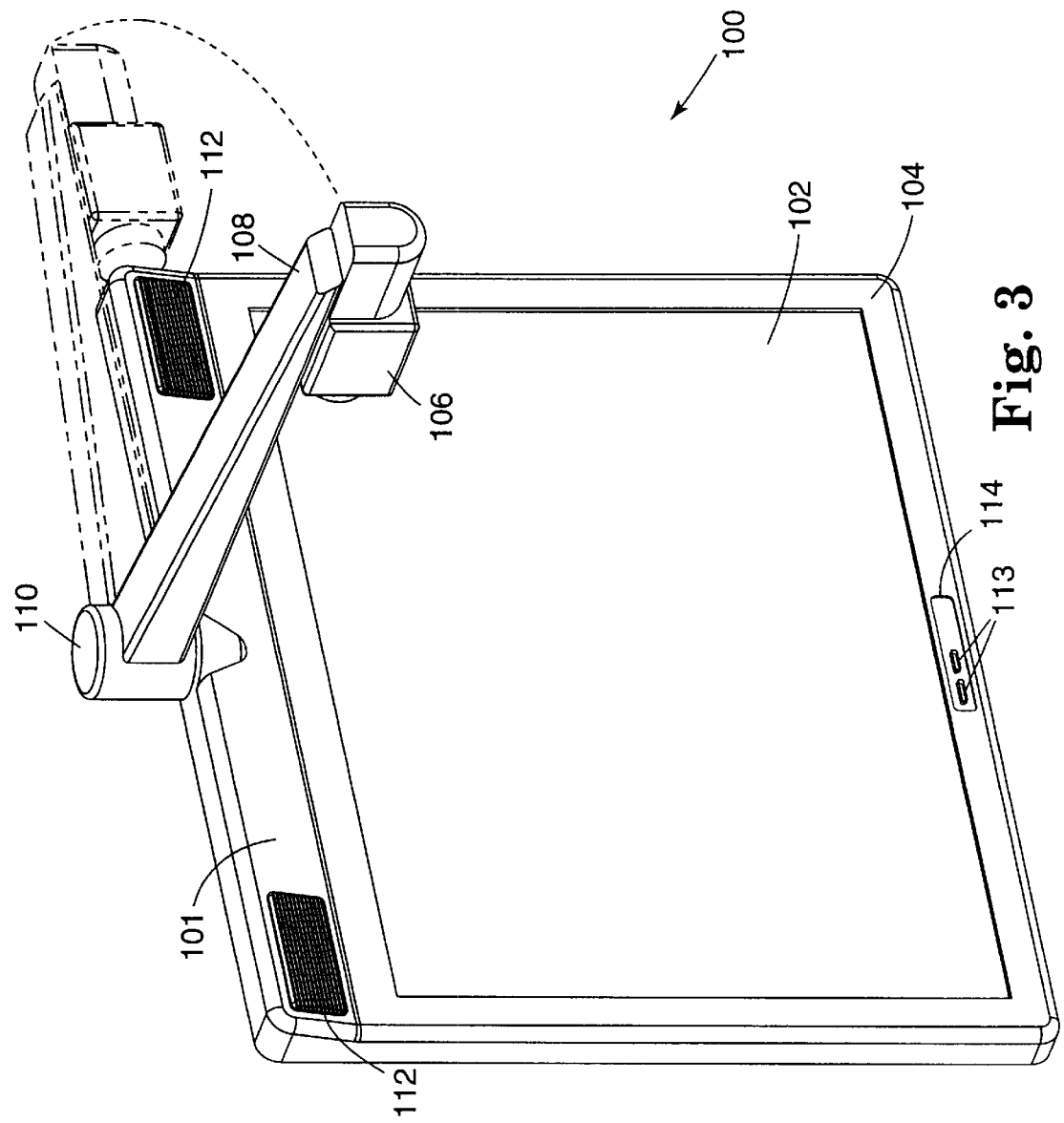
FIG. 3 is a perspective view of an integrated front projection system in accordance with the present invention in the use or projection position.

FIGS. 3–7 illustrate a first exemplary embodiment of an integrated front projection system 100 in accordance with the present invention. A particular embodiment of the present invention includes a small throw ratio, off-axis front projection system that integrates an optical engine, having modular control and power supply electronics, and a dedicated projection screen to provide a compact video display device. The term "small throw ratio" is defined as having a throw ratio $\leq 1$.

The front projection system 100 includes a body 101, and a dedicated high gain projection screen 102 mounted on a frame 104. A projection head 106 is pivotally mounted by an arm 108 to a center top portion of the frame 104 at a hinge unit 110.

Figure 4:
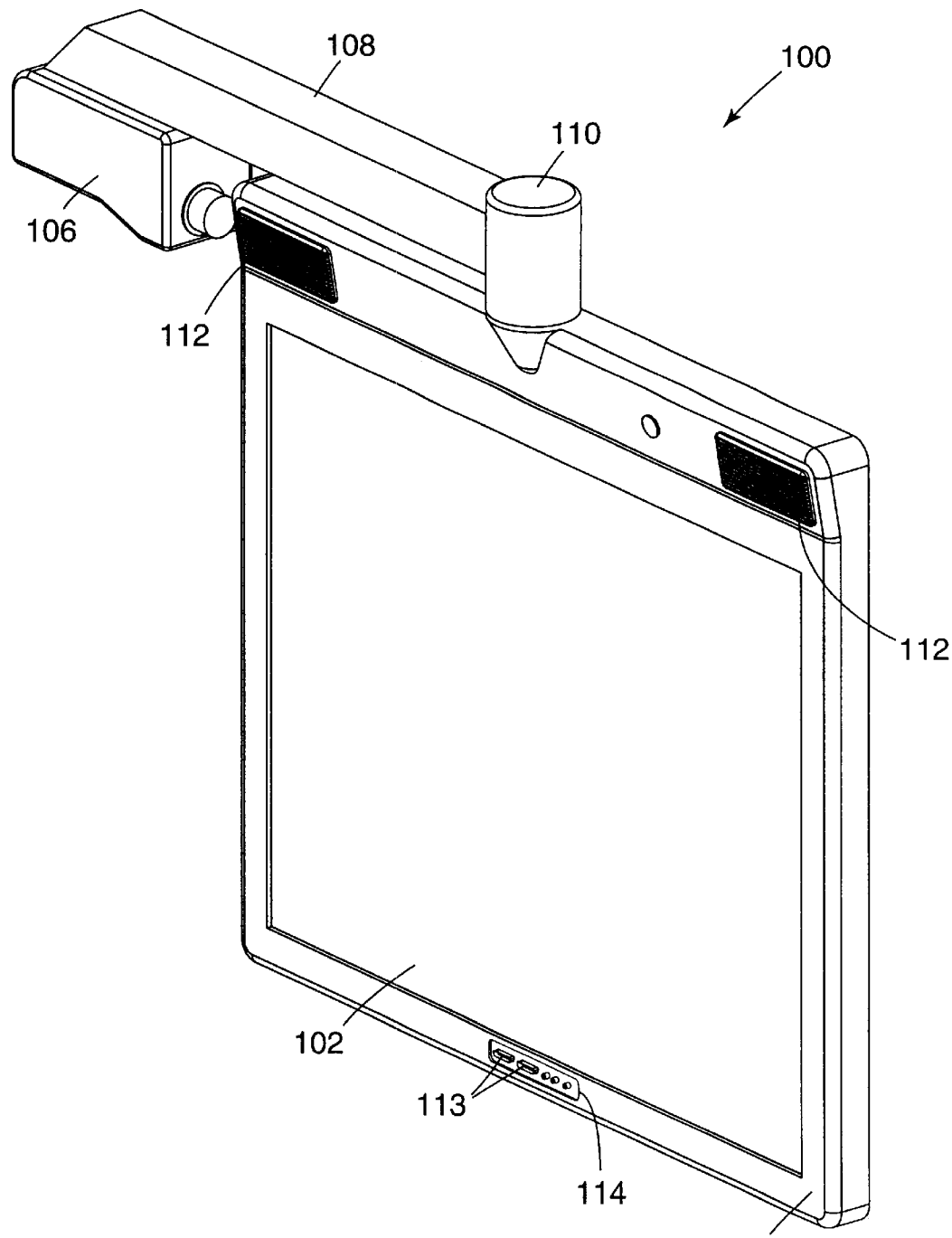
FIG. 4 is a perspective view of the integrated front projection system illustrated in FIG. 3 in the closed or storage position.

At the top and center of the frame 104, the hinge unit 110 allows the projection arm 108 and head 106 to pivot between a closed (storage) position and an open (use) position. FIG. 4 illustrates the projection system 100 in a closed or storage position. When not in use, the arm 108 may be kept in the closed position as to be substantially parallel with the frame 104, and thus present no obstruction to objects that may be moving in the space in front of the frame 104. Although the arm 108 is shown folded back to an audience left position, the system may be adaptable to allow storage of the arm and projection head to an audience right position. An ability to select storage position may be valuable in avoiding obstacles present in the projection area prior to the installation of the system. The ability of the arm 108 to rotate contributes to the projection system's minimal thickness.

Figure 5:
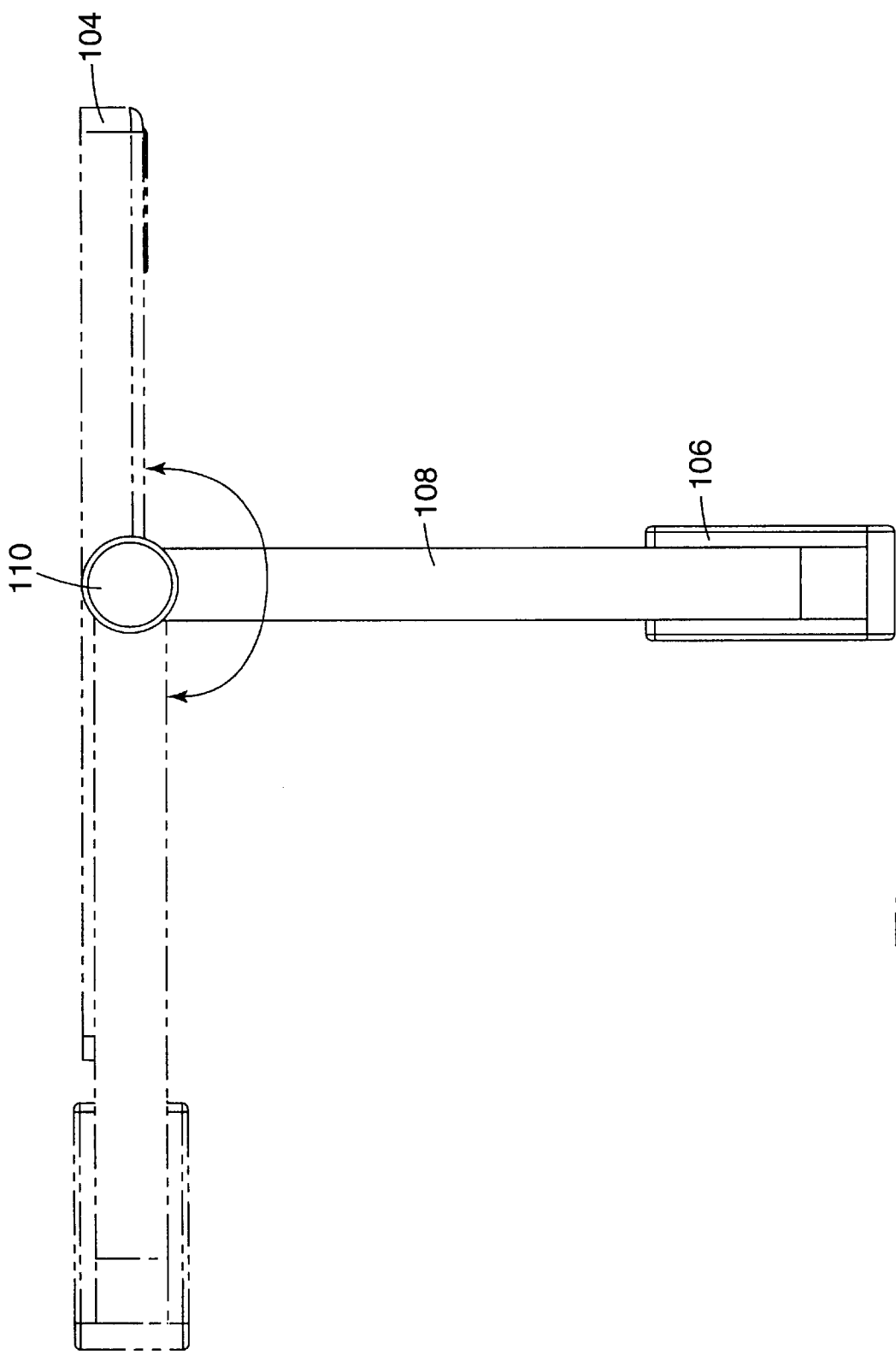
FIG. 5 is a top plan view of the integrated front projection system illustrated in FIG. 3.

As illustrated in FIG. 5, the arm 108 may be rotated a ±90° for storage on the right or the left side. In alternative embodiments, the arm may rotate less or more than 90° to place the head in a predetermined position.

In the present embodiment, the screen 102 is optically coupled to the projection head. The screen 102 may be a flexible material extended over frame 104 or may be a rigid component. In an alternative embodiment, both the screen and the frame are made of an integral sheet of material, that may be retractable into the main body 101. The screen 102 may include multiple-layers or special coatings, such as to allow its use as an erasable whiteboard. Alternative embodiments of the screen may comprise 3M multi-layer film technology, for example, as described in U.S. Pat. No. 6,018,419, assigned to 3M.

The frame 104 contains and supports other components of the system. The frame 104 may house additional components such as integrated speakers 112, input and output jacks 113, and a control panel 114. In the present exemplary embodiment, the mechanical infrastructure of the projection system 100, the arm 108 and the frame 104, include lightweight materials such as aluminum, magnesium, or plastic composites.

Figure 6:
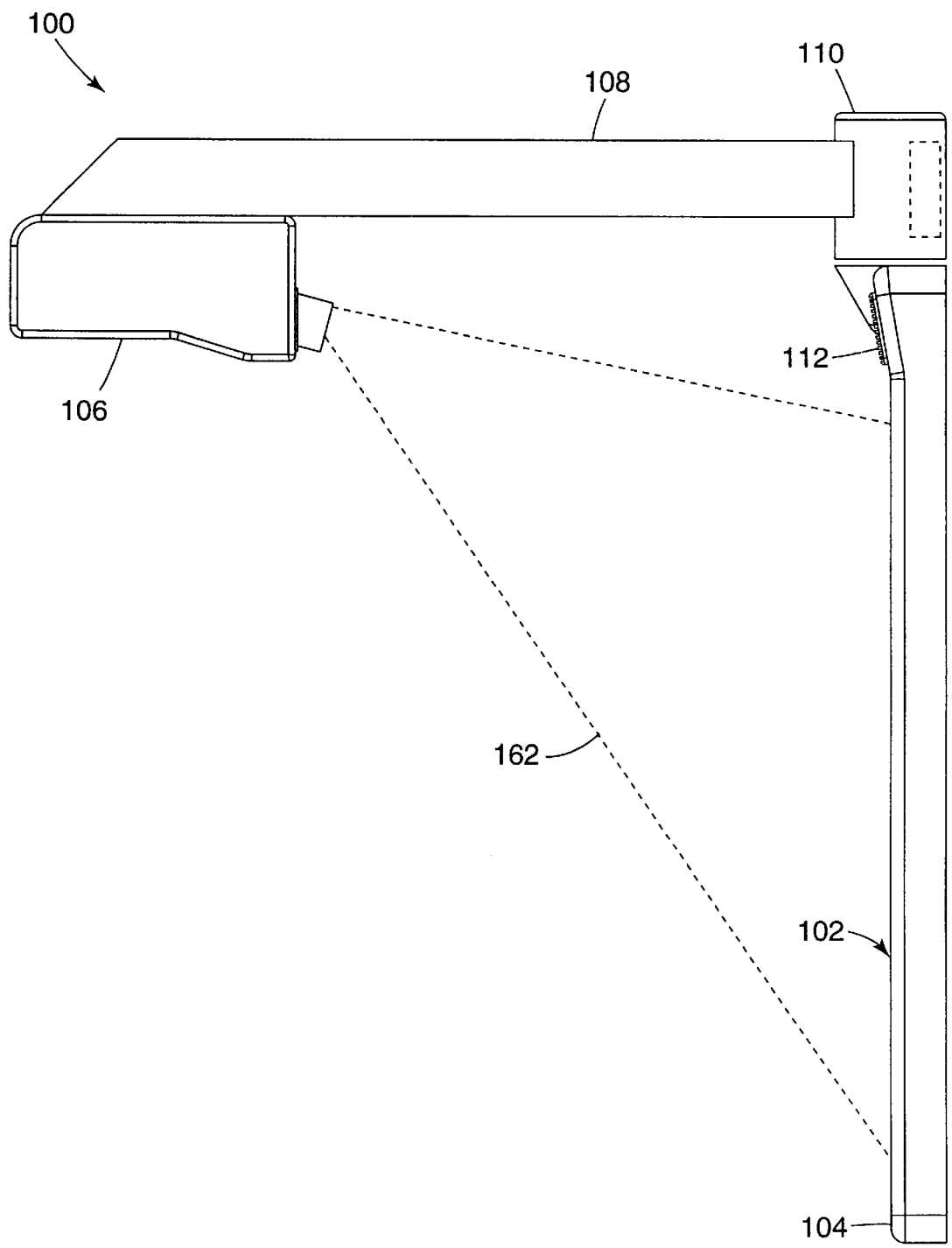
FIG. 6 is a side elevation view of the integrated front projection system illustrated in FIG. 3 in the use or projection position.

Referring to FIG. 6, when active, the projection system 100 generates a beam of light 162 having a plurality of light rays. In relation to a coordinate system wherein the screen defines a z-plane, each light ray includes components along both the horizontal x-plane and the vertical y-plane. The angle of incidence of each light beam upon the screen 102 depends on the optical characteristics of the projector, such as f-number, and the position of the projection head 106 in relation to the screen 102.

As explained in more detail in relation to FIGS. 10–18, the system 100 optimizes the coupling of the projection engine with the exact positioning of the head 106 in relation to the screen 102 to yield high contrast, brightest enhancement, image uniformity, optimal image position, and sharp focus. Since the optical parameters (e.g., offset angle, throw ratio) of the projection system are known and the exact position of the projector head 106 in the use position is known and predetermined, the exemplary screen 102 may be designed and optimized to provide maximum illumination for the audience while reducing interference by ambient light.

As may be appreciated in FIG. 6, the projection system 100 places the projection head 106 at an off-axis angle and close (short throw) distance to the screen 102, thus minimizing the possibility of the presenter's interference. Placement of the optical head 106 at such sharp off-axis angle, small throw ratio, and short throw presented unique mechanical and optical challenges. Optically, the throw distance necessary to even focus the image of a traditional projection assembly would have necessitated a long arm, further creating lever amplified stresses on the structure. Even if structurally sound, a traditional system would have projected a severely distorted and a relatively small image.

Commercially available electronic front projectors are designed to project a specified screen diagonal (D) at a specified throw distance (TD). The throw ratio (TR) of a projector is defined as the ratio of throw distance to screen diagonal $$\left(TR = \frac{TD}{D}\right).$$

Magnification is measured as screen image diagonal/imager diagonal. Optically, the small throw ratio, off-axis arrangement of the projection head 106 of projection system 100 requires that the image simultaneously accommodate three very demanding requirements: (1) short-throw distance, (2) high magnification, and (3) large off-axis projection. To minimize image shadowing, in the present exemplary embodiment, the projector head 106 is located at a projection angle $\approx 15°$ and the arm measures about 30 in. (~76 cms). The screen 102 has a screen (and desired image) diagonal of 60 inches (~152 cm.). Accordingly, the design goals for the exemplary display system 100 included (1) a throw distance $\leq 800$ mm; (2) a magnification $\geq 5OX$ (~69X for 60" diag.); and (3) image distortion correction for a projection angle ~15°.

The electronic optical engine of the present embodiment includes imaging and electronic components. As better illustrated in FIG. 7, in projection system 100 the arm 108 is a rigid hollow structure surrounded by an outer plastic shell 118. The structure of arm 108 defines an arm chamber 122 and allows for the modular and separate placement of a control and power electronics module 118 and an imaging module 120. The control and power electronics module 118 includes control boards, ballast, and other electronic components. The electronic elements are internally connected through an array of internal power and data connections. The imaging module 120 includes a light source, projection optics, color wheel and imager. Those skilled in the art will recognize that a variety of different modular arrangements may be possible within alternative embodiments of the present invention. For example, alternatively, components of the electronics module may be placed inside of frame 104.

Figure 7A:
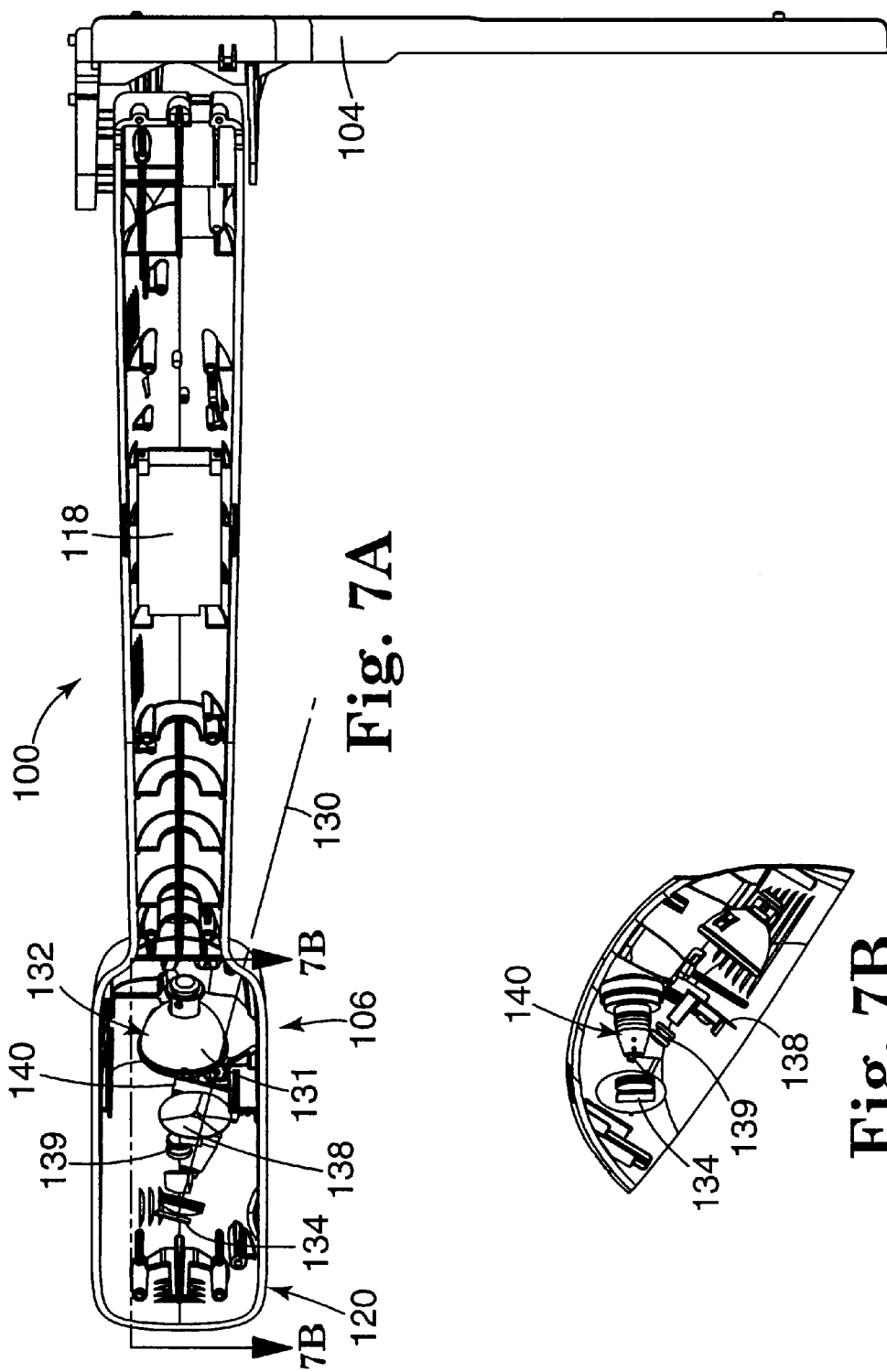
FIGS. 7A and 7B are a cross sectional schematic side elevation view and a crosssectional schematic plan view of the projection head and arm of the front projection system illustrated in FIG. 8.
Figure 7B:
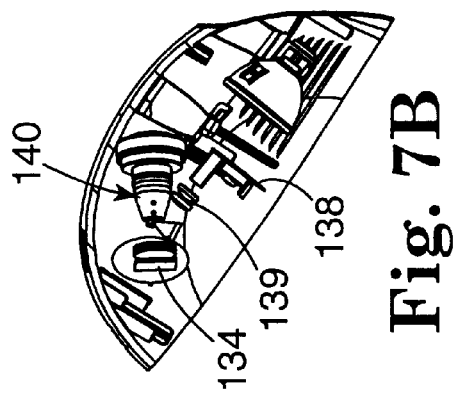

Referring to FIG. 7, the projection head 106 includes a lamp unit 132, an imager or light valve 134, condensing optics 136, a color wheel 138, a condensing mirror 139 and a projection lens 140. The projection head may also include polarization converters (for polarization rotating imagers), infrared and ultraviolet absorption or reflection filters, an alternative light source possibly coupled with a lamp changing mechanism, reflector mirrors, and other optical components (not shown). The lamp unit 132 includes a reflector 131 and a lamp 133.

In the present exemplary embodiment, the imager or light value 134 comprises a XGA digital micromirror device (DMD) having about an 18 mm diagonal, such as those manufactured by Texas Instruments, Inc., Dallas, Texas. The imager includes a plurality of pixels, generally arranged in rows and columns, that form the image. The color wheel 138 is a spinning red/green/blue/white (RGBW) color sequential disc producing 16.7 million colors in the projected image. In alternative embodiments, the color wheel and the imager 134 may be replaced by different suitable configurations, such as a liquid crystal RGB color sequential shutter and a reflective or transmissive liquid crystal display (LCD) imager. Those skilled in the art will readily recognize that other optical components and arrangements may be possible in accordance with the spirit of the present invention.

Figure 9:
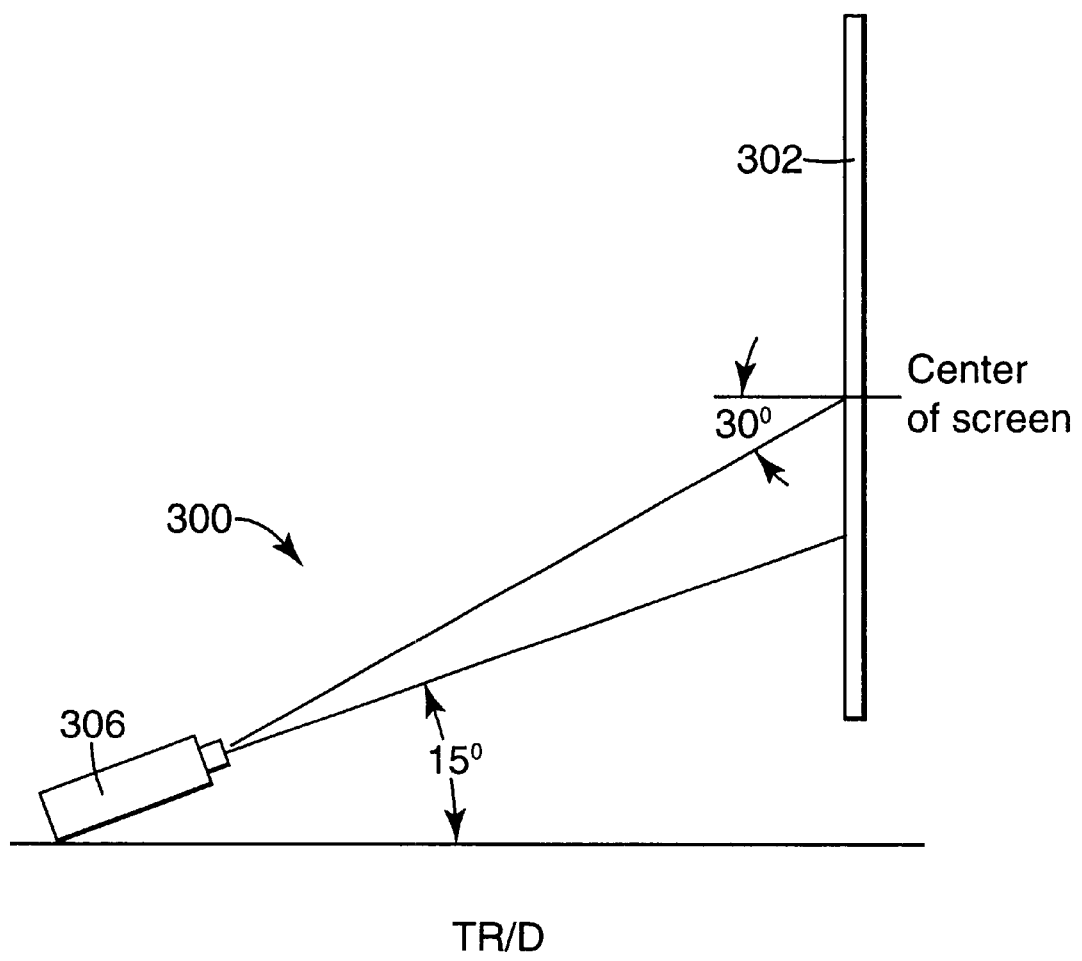
FIG. 9 is a side elevation of a third embodiment of a projector system in accordance with the present invention.

FIG. 9 illustrates a third embodiment of a projection system 300, where a separate projection engine 306 is placed at a known throw distance and angle from a screen 302. The projector 306 is tilted 15° from horizontal, but the projection beam is still 30° from horizontal. The throw ratio (TD/D) is equal to or less than one.

The system 100 allows for the projection head 106 to be placed in an exact pivotal registration in the operating or projection mode in relation to the optical screen 102. In system 100, use position is at a normal arm angle with respect to the screen and generally above the screen. However, other embodiments may be designed around other predetermined positions.

Figure 8:
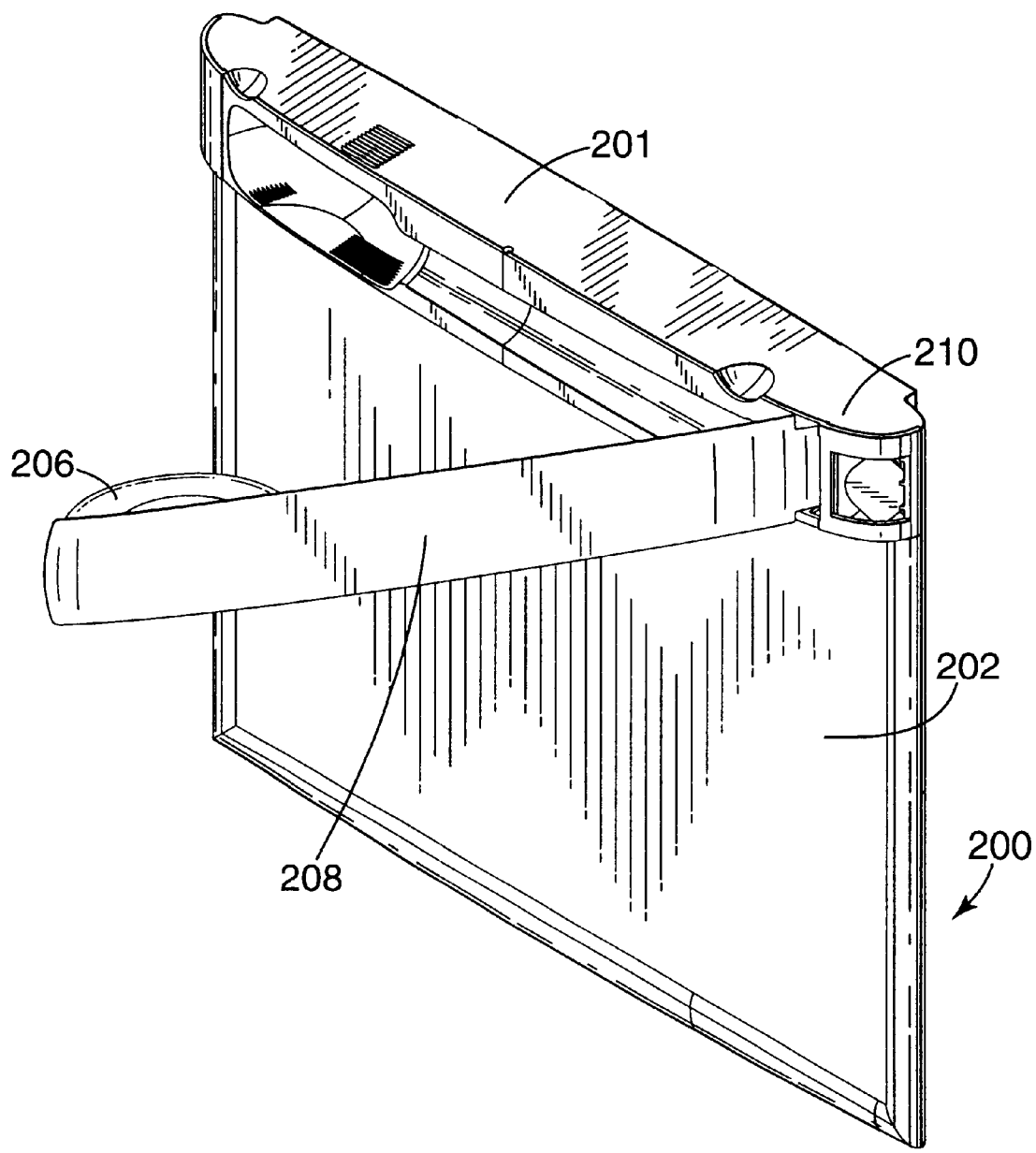
FIG. 8 is a perspective view of a second embodiment of a front projection system in accordance with the present invention.

FIG. 8 is a perspective view of a second embodiment of a short throw ratio, off-axis an integrated projector 200 in accordance with the present invention. An arm 208 holding a head 206 is hinged to a corner pivot point 210 of a main body 201. When in a use position, the head 206 is off-axis from an integrated screen 202. Movement between the two positions may be assisted manually or may be motor-driven.

Figure 10:
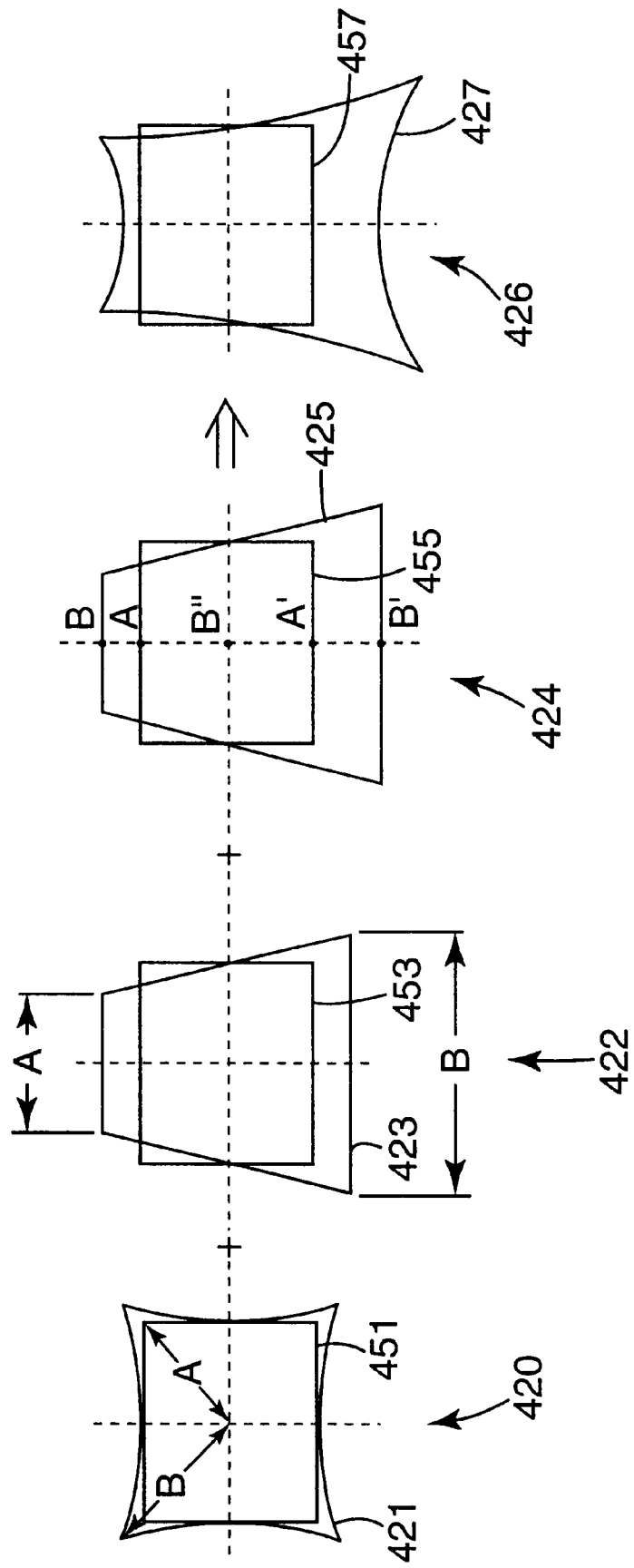
FIG. 10 is a plan view illustrating distortion components that can occur in an uncorrected short-throw, off-axis projection system like the present integrated front projection system.

The present system offers a novel combination of optical and electronic means to compensate for the image distortion caused by the off-axis, small throw ratio (≦1) projection. FIG. 10 is a plan view illustrating distortion components generated in an uncorrected short-throw, off-axis projection system. This degree of distortion is a result of the distance from the projector to the screen being short (throw ratio <1) and the optical system being off-axis.

There are three main types of distortion components in a small throw ratio, off-axis system-geometric keystone, geometric anamorphic and lens-induced pincushion distortion. Each is explained below.

Traditional throw distance projectors have not had to account for these types and magnitude of distortion components. As shown in FIG. 10, the short-throw, off-axis optics can produce a pincushion distortion component 420, a keystone distortion component 422 and an anamorphic distortion component 424 which together produced a combined projected non-rectilinear image distortion 426. The creation of a rectilinear corrected projected image, in accordance with the present invention, involves the correction by electronic and optical means of these three component types of distortion.

Pincushion distortion component 420 is a third order distortion generated by the wide-angle projection lens, as a consequence of projecting a high magnification image at a short throw distance. With respect to distortion component 420, the box 451 represents a desired undistorted image that may be projected, for example, with an ideal on-axis projection system. The segment A represents the undistorted distance from the center of the image to the corner of the image box 451. The distorted box 421 represents the pincushion distortion of this ideal image. The segment B represents the distance from the center of the image to the distorted corner of distorted image box 421. The pincushion distortion component 420 may be expressed as a distortion percentage defined as:

$$\text{Pincushion Distortion } [\%]=[(B-A)/A]100$$

using the variables shown in FIG. 10. In one embodiment of the present integrated front projection system, the lens used is a 9.44 mm focal length lens, such as that manufactured by Carl Zeiss Co. from Jena, Germany, which allows −10.4% distortion, or approximately 10%, on the design of the lens.

The geometric keystone distortion component 422 occurs because the optical system is projecting, for example, off axis 15° from a horizontal plane. In alternative embodiments of the present invention, the optical system may be off-axis, instead or in addition, with respect to a vertical plane.

Figure 11A:
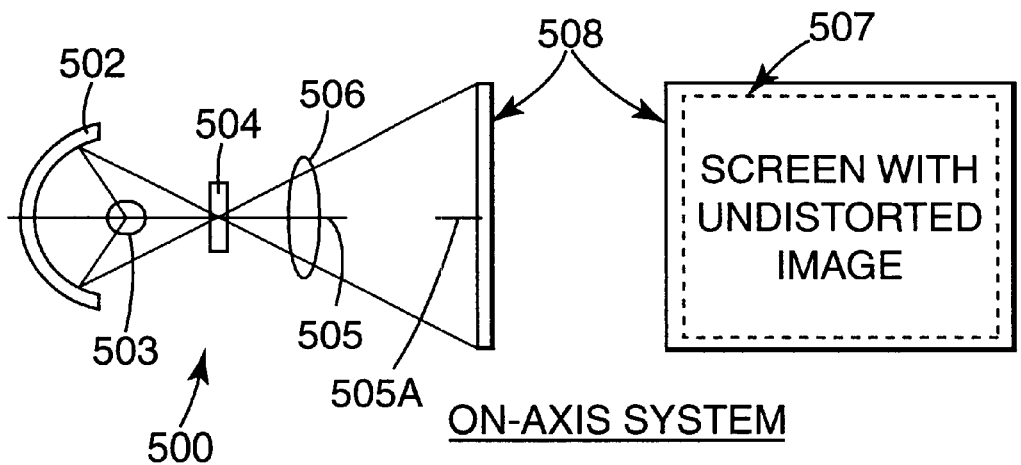
FIGS. 11A and 11B are cross-sectional views of example optical systems characterized by being on-axis, and off-axis.
Figure 11B:
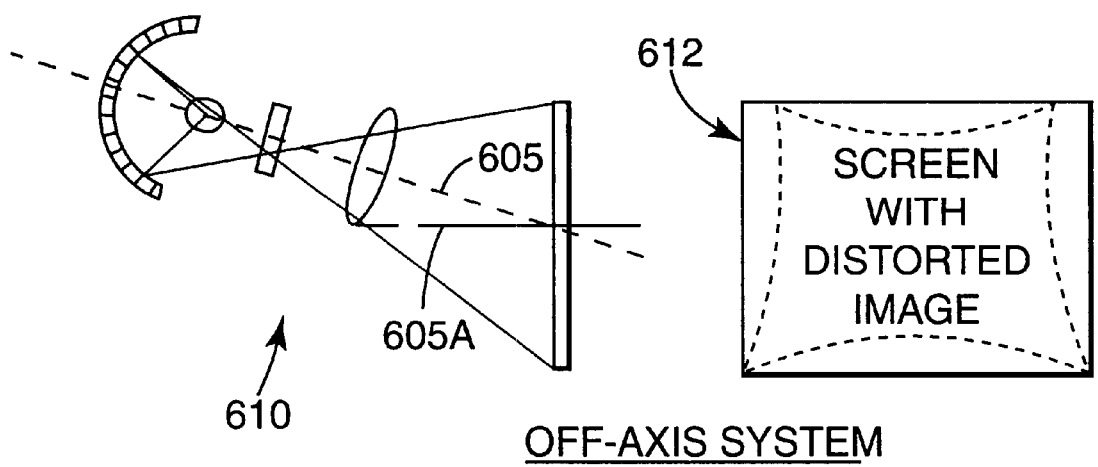

With regard to keystone distortion, FIGS. 11A–11B are cross-section side elevation views of example optical systems characterized by being on-axis, and off-axis. As shown in FIG. 11A, an on-axis optical system, indicated generally at 500, generally comprises a lamp/reflector 502, an image source 503, an imager 504 and a projection lens 506. Together, these components of optical system 500 operate to project an image onto a screen 508 along a projection axis 505. A screen axis 505A extends normal to the screen center.

Optical system 500 is "on-axis" in that the projection optics (including the lamp/reflector 502, the center of the imager 504, and the projection lens) and the projection axis 505 are in alignment with the center screen axis 505A. As an on-axis system, a corrected optical system 500 produces an image on screen 508 that does not suffer from geometric keystone distortion.

In contrast, FIG. 11B shows an optical system, indicated generally at 610, in which similar projection components are inclined in an off-axis configuration similar to the integrated front projection systems described herein. As shown, a projection optics axis 605 is now not aligned with the center screen axis 605A. In other words, the image is being projected downward at an angle. Thus, optical system 600 is referred to as "off-axis" in that the projection optics and the projection screen are not on a common axis and the projection lens 606 is positioned away from the screen axis. In this off-axis case of optical system 610, an uncorrected image 612 projected onto a screen will be distorted (including all three distortion components), as shown, due to the off-axis alignment. The distorted projected image would be wider at the bottom than the top. Similarly, for vertical off-axis projection, the image would be wider in one side and narrower at the other.

Referring back to FIG. 10, with respect to component 422, the box 453 represents a desired undistorted image that may be projected, for example, with an ideal on-axis projection system. The distorted box 423 represents the keystone distortion of this ideal image. Segment A represents the top width of the image, and segment B represents the bottom width of the image. Keystone distortion may be expressed as a percentage defined as:

$$\text{Keystone Distortion } [\%]=[(B'-A')/A']100$$

For example, the calculated keystone distortion for one embodiment of the present front projection system is 73.9%, or approximately 74%.

Because projection is being performed off-axis, another geometric distortion component, anamorphic distortion 424 occurs simultaneously with the keystone distortion 422. As shown by component 424, anamorphic distortion 424 causes the uncorrected image to be stretched in the vertical direction relative to the horizontal direction. With respect to the anamorphic distortion component 424, the box 455 represents a desired undistorted image that may be projected, for example, with an ideal on-axis projection system. The distorted box 425 represents the anamorphic distortion of this ideal image.

Points A and A' represent the top and bottom edges of desired undistorted image 455 at the center of the image. Points B and B' represent the top and bottom edges of the distorted image 425 along the center of the image, and point B" represent the middle point of the distorted image.

Figure 12:
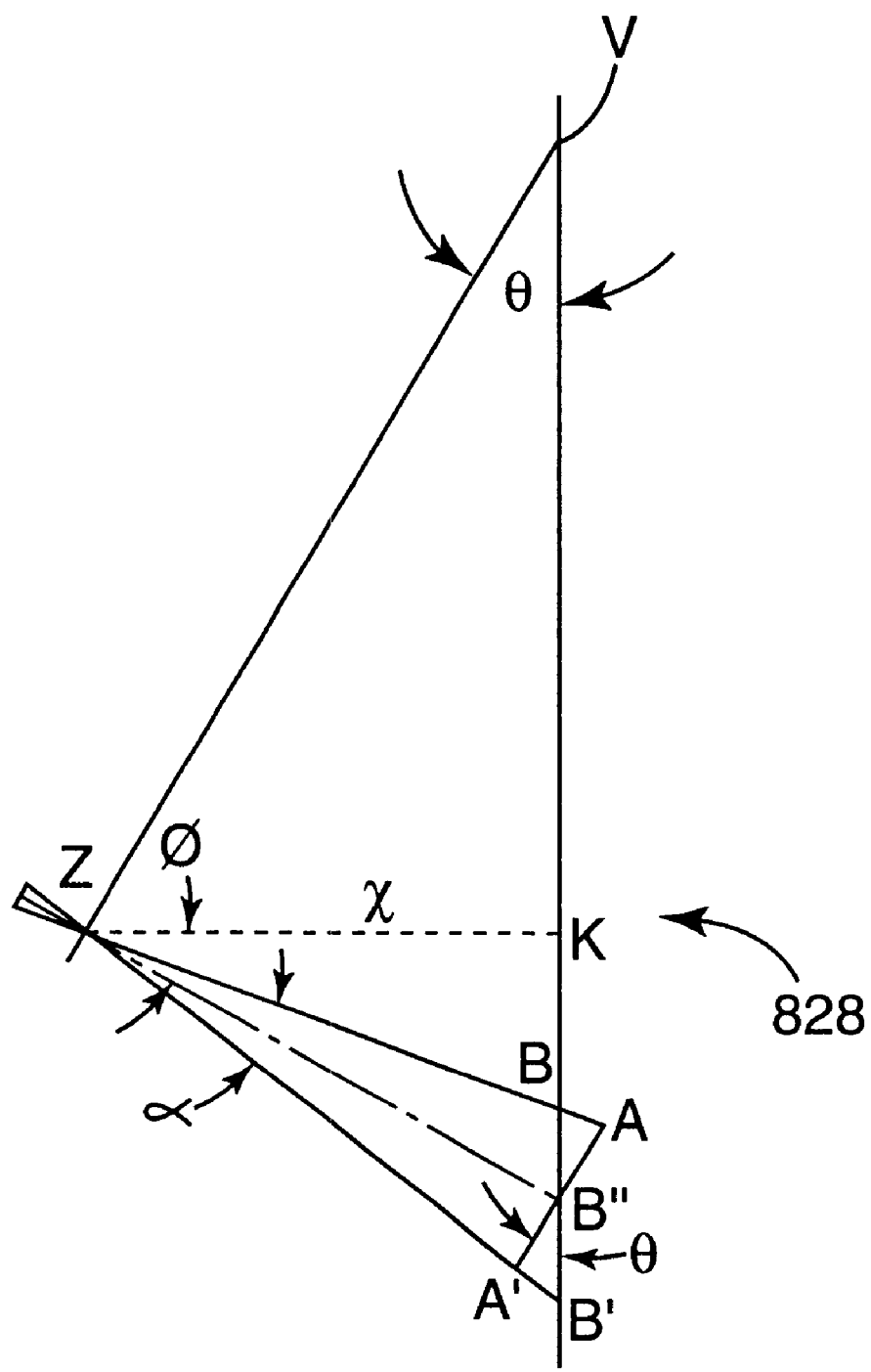
FIG. 12 is a plan view of tilted projection on a vertical screen.

FIG. 12 is a side elevation view of tilted projection on a vertical screen that defines the variables used in that equation. The illustration of FIG. 12 is taken from Rudolph Kingslake, "Optical System Design," Academic Press, 1983, pp. 269–272, relevant portions of which are hereby incorporated by reference. Points A. B. A', B', and B" correspond to the same points in the anamorphic distortion depiction in FIG. 10.

Point Z represents the "source" point of the projection lens. Point K represents the intersection point of a horizontal line from point Z and the vertical plane defined by the screen. The segment from Z to B" represents the projection axis, where B" is the point at which the image axis crosses the screen. The screen is represented by the segment going through points B", B, and B'. The distance "x" represents the perpendicular distance from the screen at point K to the point Z, which represents the projection lens (in reality, complex lens for calculations are modeled as a single lens) on the projection axis. Segment A to A' represents the image plane that passes through point B". The angle "θ" represents the angle between the image plane and the screen. The distance "x sec(θ)" represents the distance from the point Z to the point B". The angle "α" represents the angle between the segment Z to B" and the segment Z to A and the segment Z to A'. The point B represents the point at which the segment Z to A passes through the screen. The point B' represents the point at which the segment Z to A' passes through the screen. As shown in FIG. 12, the segment B to B" and the segment B' to B" follow the equations below.

$$BB''=AB''[\cos(\alpha)/\cos(\theta-\alpha)]$$

$$B'B''=A'B''[\cos(\alpha)/\cos(\theta+\alpha)]$$

The anamorphic distortion percentage may be expressed as:

Anamorphic Distortion [%]=[($x$ tan($\alpha$−$\theta$)+$x$ tan($\alpha$−$\theta$)−2$x$ sec($\theta$)tan($\alpha$))/2$x$ sec($\theta$)tan($\alpha$)]100

For example, the calculated anamorphic distortion for one embodiment of the present front projection system is 33.5%, or approximately 34%.

Referring back to FIG. 10, as shown, the result of distortion components 420, 422 and 424 is combined image distortion 426. For this overall distortion 426, the box 457 again represents a desired undistorted image that may be projected, for example, with an ideal on-axis projection system. The distorted box 427 represents combination of the pincushion distortion component 420, the keystone distortion component 422, and the anamorphic distortion component 424.

To correct for these distortion components, the present invention uses a combination of optical and electronic distortion correction. This combination solution compensates for the distortion components shown in FIG. 10, and also may compensate for changes in magnification, alignment and horizontal keystone that may occur in the process of constructing the projection system.

Figure 13:
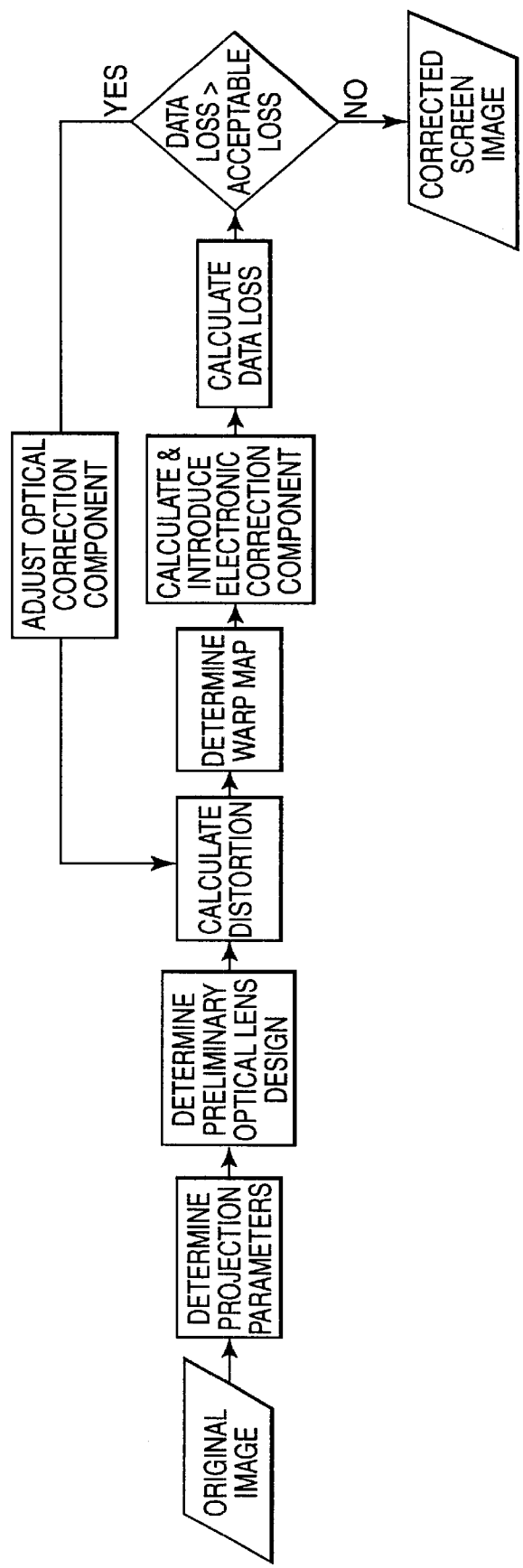
FIG. 13 is a flow diagram view of one embodiment of the method of the present invention.
Figure 14:
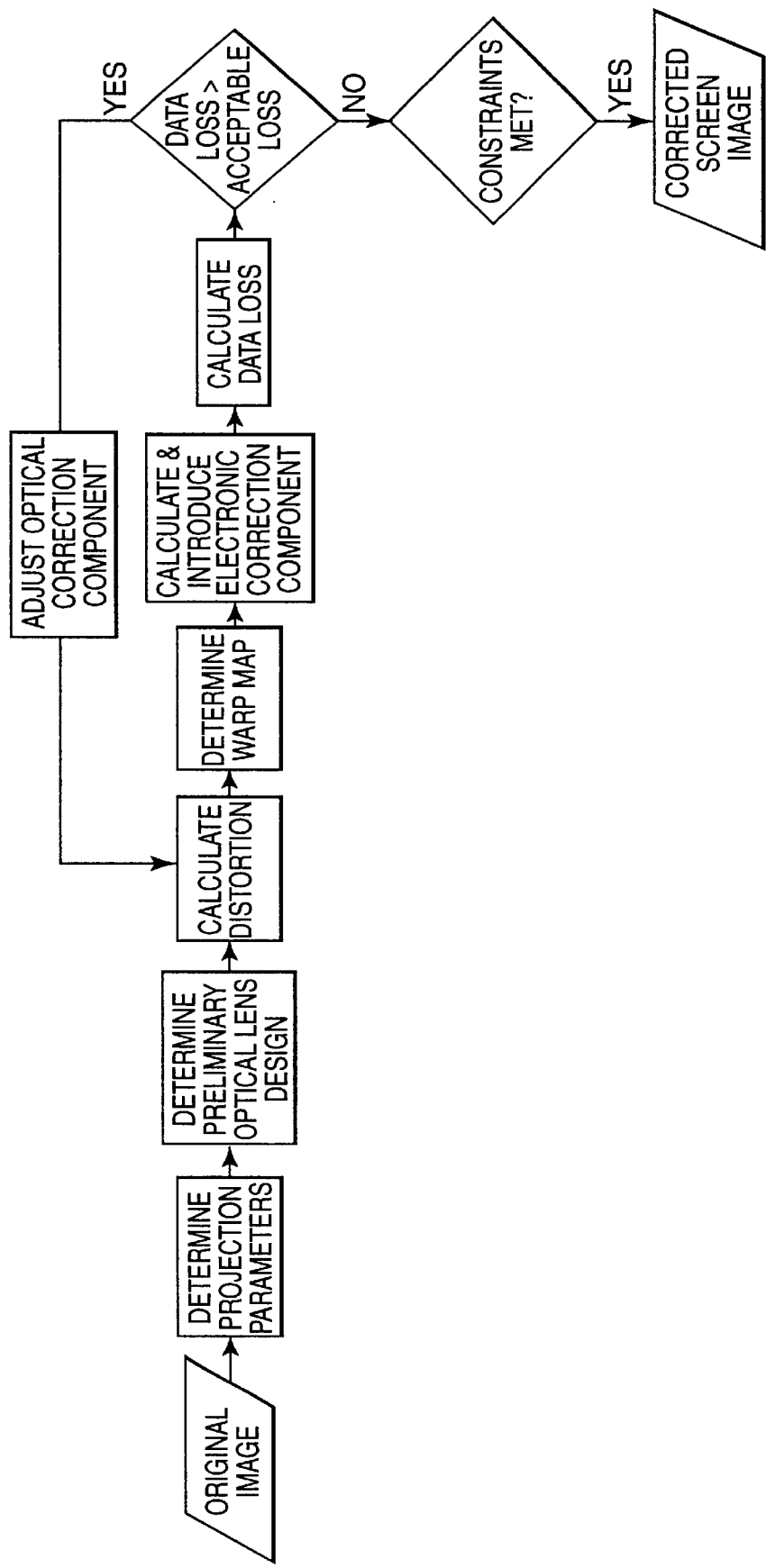
FIG. 14 is a flow diagram of a second embodiment of the method of the present invention.
Figure 15:
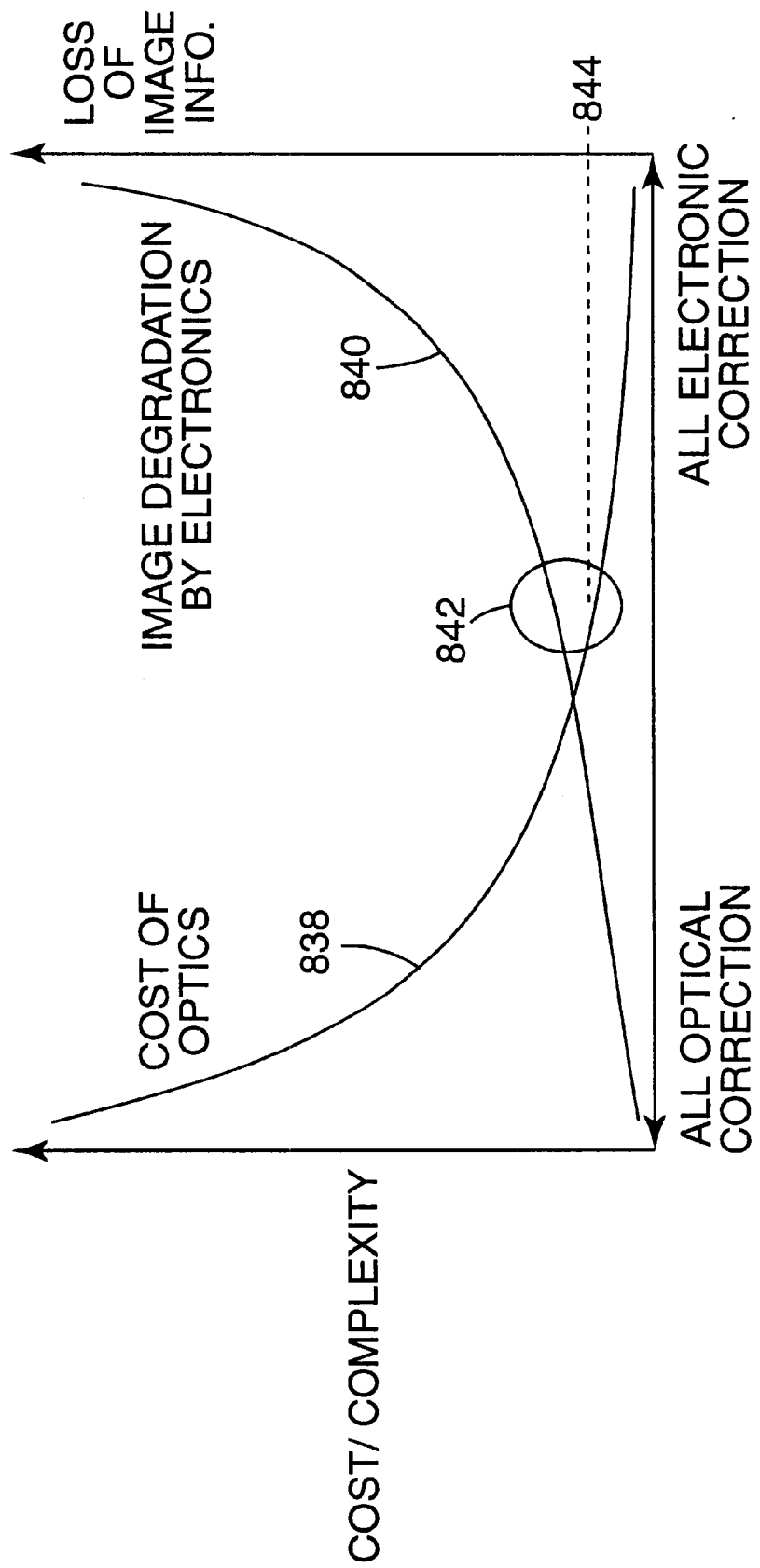
FIG. 15 is a graphical conceptual view of a method for correcting distortion generated in a projection system in accordance with the present invention.

FIG. 13 is a block diagram of a method for manufacturing a projection system projecting a distortion corrected image of the present invention. FIG. 14 illustrates a second embodiment of the method of the present invention. Rater than rely on purely electronic methods, with significant data loss, or in purely optical methods, with significant optical complexity and cost challenges, the present method details a procedure for implementing a novel optimized combined optical and electronic solution. The method illustrated in FIG. 13 establishes one of the boundary conditions for the maximum limit of electronic correction that may be combined into the system. In the method illustrated in FIG. 14, additional steps are used to further determine the optimal combination of optical and electronic correction means. FIG. 15 illustrates graphically the concept of the method of the present invention.

Referring to FIG. 13, an initial step in providing a solution is to assess the projection parameters and expected use for the system. Projection parameters include the throw ratio, the throw distance, and the offset angle. An integrated projection system such as those illustrated in FIGS. 3–7 and 8 offer predetermined consistent projection parameters. Since the offset angle, screen size and distance, and desired magnification and focus are constant, the described integrated systems lend themselves naturally to optimizing the image in accordance with the present invention. However, separate systems, such as that illustrated in FIG. 9 also may be optimized, provided the desired optical parameters are known. The present method may similarly be applied to rear projection systems suffering similar data loss and distortion challenges.

Determining the expected use of the projection system will help determine the acceptable data loss $DL_{ACC}$ for the projection system. For example, constantly refreshed video, where images rapidly change, may permit higher data loss since the eye does not have time to examine carefully each frame. In contrast, display of still data including a variety of details or small print, such as a database spreadsheet, may not tolerate high data loss.

For example, in the case of the present front projection system, an acceptable loss of 10% was selected and is represented by line 844 in FIG. 15. This choice was based on the expected use of the system illustrated in FIG. 8. At this design point 844, the optical design selection is a micro-imager illumination system with a wide angle projection lens (9.44 mm focal length diameter lens, 10% pincushion distortion). FIG. 15 graphically illustrates the concept of finding an optimal combination of electronic and optical correction of distortion in accordance with the present invention to accomplish a rectilinear distortion corrected image. The horizontal axis represents a spectrum for correcting distortion that can range from an all optical correction solution to an all electronic correction solution. On the vertical, one axis represents cost while the other axis represents loss of image information. Concerning the combination of optical correction and electronic correction, the chart of FIG. 15 illustrates two design considerations. Curve 838 shows that the cost and complexity (including factors such as weight) of the optics for the projection system range from small for all electronic correction to prohibitively high for all optical correction (if it is even possible). Curve 840 shows that the image degradation caused by the use of electronic correction ranges from small for all optical correction to unacceptably large for all electronic (again, if possible). According to the present invention, there is a solution zone, indicated generally at 842, for how much correction should be handled by the optical components and how much by electrical components. This design process involves setting an upper limit on the amount of image information that is acceptable to lose which reduces the complexity of the optical design (and thus the cost) until within an area of the acceptable loss (e.g., 10% residual distortion). Then, an optical solution is selected at that point, and the remaining correction needed to be accomplished is done so electronically.

FIG. 17 shows exemplary projector system parameters. The projection screen is vertical and has dimensions of 922.4 mm high by 1227.2 mm wide. The projection lens final element is 782 mm from the screen plane, 74.5 mm above the top of the screen, and the projection lens axis points downward 15° from the horizontal.

Referring back to the steps of FIG. 13, with the projection parameters, one selects a first optical design that addressed the throw ratio, focus, and off-angle constraints. While distortion components are a factor, they are not taken as the controlling factor in deciding the optical design at this point.

Having selected an optical design and knowing the projection parameters allows the calculation of the distortion components for a not-electronically corrected image under the parameters of the system. The keystone, anamorphic and pincushion distortion percentages may be calculated for the system. The distortion components may be calculated using the exemplary procedures detailed above or other suitable procedures. In this particular example, the distortion components for the exemplary system were calculated to be approximately 10% pincushion distortion, 74% keystone, and 34% anamorphic.

The shape of the not-electronically corrected or unmodified image when projected may be derived. A warp map for the correction of the distortion components. As the exact distance and orientation between the projector and the screen is known and fixed, a warping map—tailored to the physical and optical characteristics of the system—may be prepared. A warp or warping map is defined as the mapping of the imaging pixels in the imager to yield a shaped or pre-distorted electronic image on the imager that corrects the not electronically corrected projected image.

The exact shape of the pre-distorted imager image necessary to produce a corrected, in this case rectilinear, image on the projection screen is calculated using a three-dimensional ray trace that models the optical system as a point at the lens exit pupil, or alternatively, by an actual ray trace through the system. This includes a mathematical description of the effects of lens pincushion distortion, keystone distortion, and anamorphic distortion.

Figure 16:
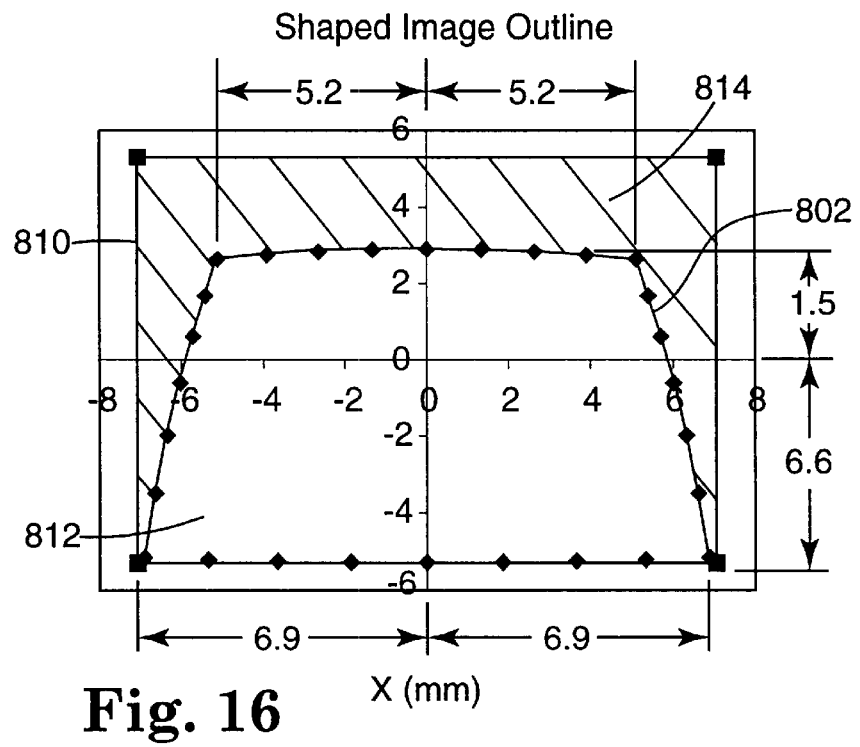
FIG. 16 is an outline of the shaped image.

In FIG. 16, the outline 802 represents an image boundary shaped to compensate, for example, for keystone and other optical distortions. Outline 802 also represents a distortion-correcting image 802 that is shaped to compensate for the calculated amounts of anamorphic, keystone, and optical distortion. Thus, when projected, the image would be projected as a corrected rectilinear image. In particular, the FIG. 16 embodiment of distortion correcting image 802 would be appropriate for use in an optical application with a small throw ratio, high tilt angle such as that described herein. As such, rather than being rectangular, for example, the nominal (uncorrected) image of this embodiment of imager 802 has a bottom width of approximately 13.798 mm (6.899 mm+6.899 mm) and a top width of approximately 10.428 mm (5.124 mm+5.124 mm). Also, as shown, the image center correlates to a position approximately 5.163 mm from the bottom imager 802, and the overall height of imager 802 is approximately 8.065 mm (2.902 mm+5.163 mm).

The image boundary and the distortion information are mapped and extrapolated to correspond to the pixels on the imager, creating a warp map.

Figure 17A:
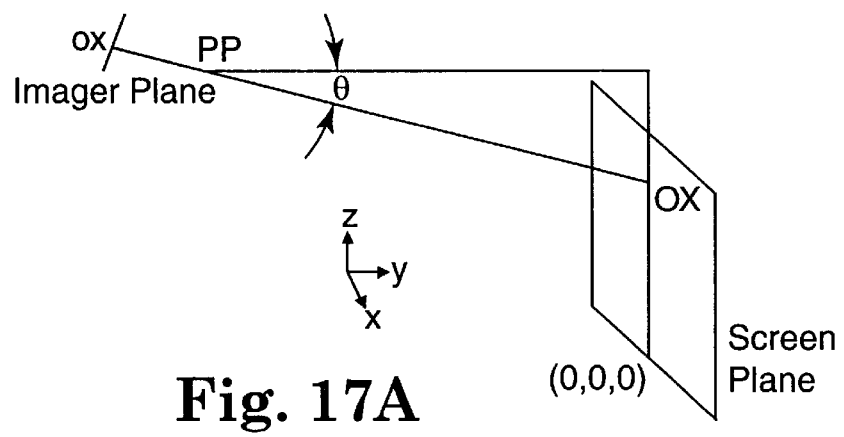
FIGS. 17A and 17B are line diagrams of the projection ray path.
Figure 17B:
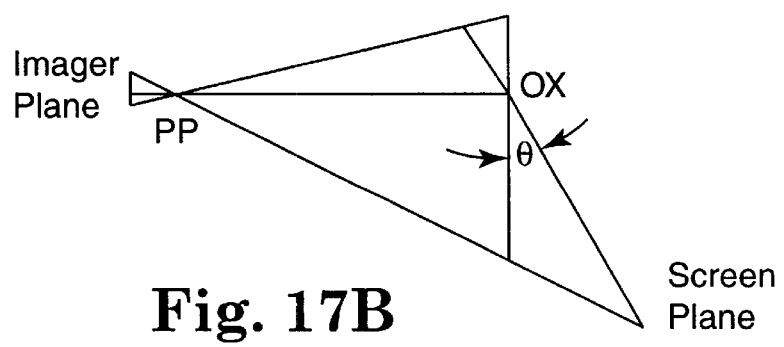

Referring to FIGS. 17A and 17B, the locations of the pupil point PP, intersection point of the optical axis with the screen plane OX. For this exemplary system PP is defined by the coordinates x=0, y=−782, z=997.2, and OX is defined by the coordinates x=0, y=0, z=787.6.

The calculated shape of the pre-distorted image on the imager accounts for the residual keystone and anamorphic distortion generated by the 15° downward projection axis, and ≈10.4% projection lens pincushion distortion. To calculate the location of the shaped image edge points, an array of projected image edge points is defined for the desired projected image size in the screen plane shown in FIG. 17A. Some examples of points in the defined 3-dimensional coordinate space would be x=−613.6, y=0, z=922.4; x=613.6, y=0, z=922.4; x=613.6, y=0, z=0; x=−613.6, y=0, z=0. These four points define the four corners of the projected image on the screen plane, with additional edge points defined by varying x from −613.6 to 613.6 and z from 0 to 922.4 to form an array of edge points.

A series of line unit vectors from each point on the projected image edge passing through the pupil point PP is then defined as EP0. Additionally, a plane is defined which contains the point OX and is parallel to the plane of the shaped image as in FIG. 17B. If the same optical system were to project an image on this plane, the image would have no keystone or anamorphic distortion as the projection angle would be 0 degrees. In this plane, the intersection of the projected edge point line unit vectors EP0 is calculated for each edge point. These points may be described by the equation $$EP1 = PP + \frac{L2}{EP0 * OA} * OA,$$

where PP is the location of the pupil point, L2 is the distance from point PP to point OX, EP0 is the array of vectors defining the location of the actual projected image edge points in the screen plane, and OA is the optical axis unit vector.

Staying in the plane parallel to the shaped image plane and through the point OX, the effect of optical distortion can be considered by defining a set of points in this plane that would represent an image with 0% optical distortion and comparing them to the points defined by EP1. These points may be described by the equation $$ep2 = ep1 * d,$$

where ep2 is the distance from OX to each undistorted point in this plane, ep1 is the distance from OX to each distorted point in this plane defined by EP1, and d is a measure of the system distortion, for this system 0.104 or 10.4%. An array of vectors defining the locations of each point ep2 may be defined as EP2, and an array of line unit vectors from the points EP2 through the pupil point PP can be defined as V2.

A complex optical system may be modeled as a pinhole at the exit pupil. In such a model, the object and image points are located along a straight line through the pupil point. Since the effects of keystone, anamorphic distortion, and optical distortion have been accounted for in calculating V2, the final shaped image edge point locations can be defined by calculating each point where a line from the points EP2 through the pupil point PP intersects the shaped image plane. These points may be defined in the 3-dimensional coordinate space of this transform as $$V1 = PP - \frac{L1}{V2*OA} * OA,$$

Where PP is the pupil point, L1 is the distance from PP to the shaped image plane along the optical axis, V2 is the array of line unit vectors from point EP2 through PP, and OA is the optical axis unit vector. V1 gives the x, y, and z coordinates of the edge points of the shaped image in the 3-dimensional coordinate space of this transform.

To plot the outline of the shaped image in the 2-dimensional plane of the shaped image, the points defined by V1 are translated to the origin of the 3-dimensional transform space and rotated 15 degrees about the x axis to give $$XZ = \begin{pmatrix} 1 & 0 & 0 \\ 0 & \cos 15° & -\sin 15° \\ 0 & \sin 15° & \cos 15° \end{pmatrix} * V0,$$

where V0 is the distance form the points defined by V1 to the point where the optical axis intersects the shaped image plane. XZ is then an array of points in 3-dimensional space which all have y=0, and the x and z coordinates represent the location of the shaped image edge point coordinates in the plane of the imager, with the point x=0, z=0 defined as the point at which the optical axis intersects the plane. The resultant calculated shape of the pre-distorted imager image to produce a rectilinear image on the projection screen, given the expected lens distortion, and the keystone and anamorphic distortion generated by the off-axis projection, corresponds to 802 as shown on FIG. 16. For a system magnification of 88.3x, the shaped image has a bottom width of approximately 13.8 mm and a top width of approximately 10.4 mm. Also, the image center correlates to a position approximately 5.2 mm from the center of the lower boundary, and the overall height of imager 802 is approximately 8.1 mm. The outward curvature of the image boundary is opposite to the inward curving boundary of a projected image with pincushion distortion.

The warp map does not merely determine the outer boundary of which pixels are to be turned on and which pixels are to be turned off. The warp map also may relate pixels in the original electronic image to specific new pixel points on the imager. Since the resolution (number of pixels) of the warped image may not correspond to the number of pixels in the original electronic image, the warp map also may determine which pixels of data are not displayed (i.e., lost pixels).

The concept of image warping has been used for military real time imaging applications. The image warping functionality of a microchip, is described for example in the mentioned U.S. Pat. No. 5,594,676, relevant portions of which are incorporated herein by reference. Real time warping requires extraordinary computing power and feedback regarding the relative positions and orientations of the projector and screen.

However, in previous image warping techniques, image information may be lost through the mapping and extrapolation process. This is so because, for example, in the top row, an image that is nominally 14.12 mm wide will be compressed into an image that is 10.248 mm wide. As illustrated in FIG. 16, since the pixel density of a normal imager is not adjustable, the portion 812 within outline 802 will include fewer pixels than the whole imager size 810, and yet be trying to convey the same image information. Thus, image information will be lost. Pixels within portion 814, which is not used after remapping into portion 812, will simply be dark and unused to provide image projection. This portion 814, therefore, represents wasted imager space and lost data. While this data loss may be considered acceptable in some real time, constantly updated, displays, it may be unacceptable for certain display applications.

In the method of the present invention, once the warping map has been calculated, it is then applied to the electronic imaging component (i.e., imager or light valve). The warp map is implemented using an electronic correction component. In the present exemplary system, the electronic correction component is selected to be a pre-distortion firmware integrated circuit chip that electronically pre-distorts the unmodified image according to the warp map to account for distortion that will occur as the image passes through the projection system. In a particular embodiment, the present invention couples image warping technology with the integrated design of a wall mounted projector. In particular, one such pre-distortion microchip selected for use in the present front projection system is a product manufactured by Silicon Video, Inc. of North York, Ontario, Canada. A warped or pre-distorted image on the imager results.

The electronic data loss, $DL_E$ of this pre-distorted image in the electronic imaging component may be measured. One method for measurement first calculates the entire area of the warped image on the imager, $A_w$. The area may be calculated in pixel units or using other suitable area unit measurements. As the total imager area $A_T$ is known or easily calculated, a data loss percentage, DL%, may be calculated, where:

$$DL\% = 100 - [(A_w/A_T)*100]$$

For example, the total number of pixels for an XGA resolution imager is 1024 horizontal by 768 vertical (786,432 pixels). In one warped image embodiment the number of pixels actually utilized is calculated to be 502,680. The electronic data loss $DL_E$ is then one minus the ratio 502,680/786,432, or about 36%. In this exemplary projection system, it was determined through image analysis and user feedback that the acceptable data loss was approximately 40%.

Other methods calculate the maximum data loss at a specific row or column on the warped image. The width, in pixels, of the narrowest row of pixels in the pre-distorted image is measured. Similarly, the height of the shortest column of pixels may be used. The result is then divided over the known number of available pixels in that row or column. These calculations yield maximum vertical and horizontal data loss.

The next step is to compare the electronic data loss with the acceptable data loss for the system. If $DL_E \leq DL_{ACC}$, that is, the data loss is acceptable, the system is within the acceptable design parameters.

If $DL_E > DL_{ACC}$, then the next step is to provide an optical correction mechanism that reduces the distortion components. The above steps of calculating the distortion, deriving and applying a warp map, and measuring the data loss are repeated until $DL_E < DL_{ACC}$. In the present exemplary embodiment, electronic correction alone yielded data loss in excess of the acceptable 10%. To provide keystone distortion correction, the light valve center was shifted from the projection lens center to correct a portion of the keystone distortion. Different correction techniques may be combined. For example, keystone correction also may include screen inclination. In an alternative embodiment, the screen may be motor driven, to reach an inclined projection position at the time that the arm is placed in the open position.

Figure 18:
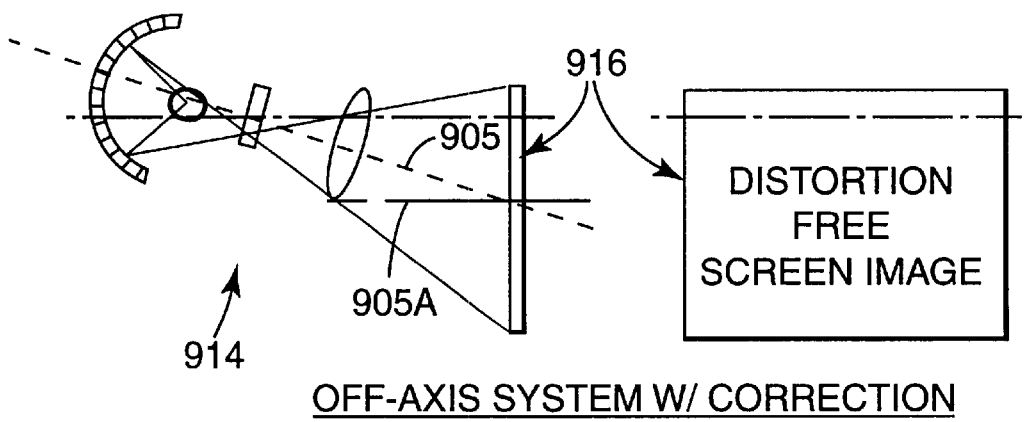
FIG. 18 is a side elevation schematic of a system including both optical and electronic correction.

FIG. 18 illustrates an off-axis optical system in accordance with the present invention, indicated generally at 900, with optical correction for geometric keystone distortion. As illustrated in FIG. 18, the projection optical axis is displaced 3.7 mm from the optical center of the imager for optical correction of ≈58% of the total keystone distortion.

However, full keystone correction by off-setting the imager center from the projection axis presents difficulties in extreme off axis systems. As the magnitude of offset increases, the off-setting technique requires that the imager be farther off-center. A lens design has a determined object field, or simply field of the lens. At some point, the imager falls out of the object field of the lens design. While, in some cases, it may be possible to redesign the lens to increase the field, such a redesign usually involves added optical costs, size, weight and/or complexity. Furthermore, as the imager is offset and the lens design changes, pincushion distortion is affected.

In the present exemplary analysis, the projection lens pincushion optical distortion is corrected electronically by the warp transformations. The off-axis geometric keystone and anamorphic distortions are partially corrected optically by transverse displacement of the projection lens relative to the imager, and partially corrected electronically by the warp transformations. In a completely uncorrected off-axis system there is an allowed 10% pincushion lens distortion, resultant 74% keystone distortion and 34% anamorphic distortion. By optical and electronic means, these distortions are reduced to a negligible amount. The proportional mix of these corrections is given in the following table.

| Distortion Type | Total Uncorrected Distortion | Proportion of Optical Correction | Proportion of Electronic Correction | Final Corrected Distortion |
|---|---|---|---|---|
| Pincushion | 10% | 0.0 | 1.0 | 0% |
| Keystone | 74% | 0.58 | 0.42 | 0% |
| Anamorphic | 34% | 0.76 | 0.24 | 0% |

FIG. 14 illustrates a further refinement to the method illustrated generally in FIG. 13. While the initial steps are the similar, after it is determined that $DL_E<DL_{ACC}$, the question is asked on whether the cost targets and system constraints are met. System constraints may include factors such as size, weight, safety, regulatory compliance, manufacturing complexity, reliability or other facts considered important for the specific optical design. If these requirements are not met, the method of the present invention returns to the step of selecting the optical design. This additional decision step allows the designer to analyze whether the optical design has been overengineered and whether the optimal combination of electronic and optical correction has been selected. Conceptually, the first decision point, $DL_E \geq DL_{ACC}$, and the iterative process it regulates determine the right boundary of the optimal solution zone 842. The second decision point and its iterative process help determine the left boundary of zone 842.

In accordance with the present invention, a combined electrical and optical solution is provided for correcting a projection image from non-linear distortion (including the effects of keystoning) as that distortion is exemplified in FIG. 10. This highly coupled system can comprise a projection illumination system that encompasses a multiple element projection lens (with a focal length of lesser or equal to the imager height), and approximate f-number of f/2.8 in conjunction with the electronic front end firmware. The projection lens is designed to handle a wide angle/short throw optics by optimizing the relationship between field angle, focus uniformity and illumination uniformity. Because of cost and size considerations for the projection lens, it is desirable to retain some optical distortion; e.g., a pincushion distortion in the lens design likewise, less than full correction of keystone distortion may be desired. As described above, the electronic part of the solution consists of the firmware chip which utilizes a correction technique that pre-distorts the output image to compensate for the distortions that will be introduced by the rest of the system. The end result is a corrected screen image. It should be understood that effective electronic correction requires an accurate and precise description of the distortion and a means of mapping the original input data to the properly corrected output.

Those skilled in the art will readily appreciate that elements of the present invention may be combined, separately or in one system, to provide videoconferencing, data-conferencing, and electronic whiteboard functions, as well a any other function where a light and compact display system may be useful.

As the system of the present invention is designed to optimize the projection image at the predetermined projection position, no set-up adjustments are necessary to the optics, mechanics, or electronics and optimal on-screen performance is consistently offered. The integral structure of the system allows for easier storage and portability and avoids cabling and positioning associated with the use of traditional projectors.

Those skilled in the art will appreciate that the present invention may be used with a variety of different optical components. While the present invention has been described with a reference to exemplary preferred embodiments, the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the spirit and scope of the present invention.

What is claimed is:

1. A method for manufacturing a projection system projecting a distortion corrected image, the projection system including optical projection components and an electronic imaging component, the method comprising the steps of:

a. determining the acceptable data loss, $DL_{ACC}$ for the projection system, b. determining the optical projection parameters of the projection system, including projection angle and throw ratio;

c. calculating distortion components for a not-electronically corrected image under the optical projection parameters;

d. determining the shape of the not-electronically corrected image when projected;

e. calculating a warp map for the correction of the distortion components;

f. applying the warp map to the electronic imaging component;

g. measuring the electronic data loss, $DL_E$, in the electronic imaging component;

h. if $DL_E>DL_{ACC}$, then provide an optical correction mechanism that reduces the distortion components; and i. repeat steps c through h until $DL_E \leq DL_{ACC}$.

2. The method of claim 1, further including the step of evaluating whether the system constraints of the optical design are met and if not, redesigning the optical design.

3. The method of claim 2, wherein the system constraints include cost.

4. The method of claim 1, wherein the step of calculating distortion components includes calculating pincushion, keystone, and anamorphic distortion components.

5. The method of claim 1, wherein the step of determining the acceptable data loss includes evaluating the screen image resolution desired for the particular application of the projection system.

6. The method of claim 1, wherein the projection system is an off-axis, small throw ratio front projection system.

7. The method of claim 6, wherein the projection system includes an integrated screen design having a constant throw ratio, throw distance and offset angle.

8. The method of claim 1, wherein the electronic imaging component is an XGA resolution imager and the acceptable data loss is determined to be 40%.

9. A projection system manufactured in accordance with the method of claim 1.

10. A front projection system, comprising:
   a. a front projector device including:
      i. off-axis optics and a throw ratio of at most 1, which generate lens and geometric distortion components;
      ii. optical distortion correction; and
      iii. an electronic distortion correction operable to pre-distort an image prior to projection by the projection device;
      iv. wherein the combined optical and electronic correction are selected to essentially correct for both the lens and geometric distortion components of the projector device, while maintaining data loss below a minimum acceptable level.

11. The front projection system of claim 10, wherein the lens distortion component comprises pincushion components.

12. The front projection system of claim 10, wherein the geometric distortion component comprises anamorphic and keystone distortion components.

13. The front projection system of claim 10, further including an integrated screen, wherein the front projector device is integrally coupled to a projection screen having a constant throw ratio and offset angle.

14. The front projection system of claim 13, wherein the front projector device comprises an arm movably coupled to the projection screen.

15. The front projection system of claim 10, wherein the electronic distortion correction component comprises an integrated circuit chip having image predistortion functions.

16. A method for correcting distortion generated in a projection system, comprising:
   a. providing an off-axis projection system having a throw-to-screen diagonal ratio of at most 1;
   b. setting a limit on the amount of image information that is acceptable to lose through the optical components;
   c. selecting an optical solution comprising optics having inherent distortion within the set limit; and
   d. selecting an electronic correction component operable to pre-distort an image to correct for remaining distortion not corrected by the optics of the optical solution.

17. The method of claim 16, wherein an XGA resolution imager is used to create the image and the step of setting the limit comprises setting a limit of approximately 40% loss of image information.

18. The method of claim 16, wherein selecting an optical solution comprises selecting a lens having a 9.44 mm focal length.

19. The method of claim 16, wherein selecting an electronic correction component comprises selecting an integrated circuit chip having image pre-distortion functions.

20. The method of claim 16, wherein selecting an optical solution comprises selecting a lens having a 9.44 mm focal length that generates approximately 10% pincushion distortion, approximately 74% keystone distortion and approximately 34% anamorphic distortion.

21. The method of claim 16, wherein the providing step further comprises providing a front projector device within the projection system that is movably coupled to a projection screen.

22. The method of claim 16, wherein the step of selecting an electronic correction component comprises utilizing an integrated circuit chip having image pre-distortion functions.

* * * * *

UNITED STATES PATENT AND TRADEMARK OFFICE
CERTIFICATE OF CORRECTION

PATENT NO. : 6,520,646 B2
DATED : February 18, 2003
INVENTOR(S) : Rodriguez, Ernesto M. Jr.

It is certified that error appears in the above-identified patent and that said Letters Patent is hereby corrected as shown below:

Title page,
Item [75], Inventors, delete "Patricia H. DeLuca" and insert in place thereof
-- Patricia M. Hughes --

Column 9,
Line 42, delete "(throw ratio<1)" and insert in place thereof -- (throw ratio$\leq$1) --

Signed and Sealed this

Nineteenth Day of August, 2003

JAMES E. ROGAN
*Director of the United States Patent and Trademark Office*